Feb. 22, 1966  J. RUTKUS, JR., ETAL  3,236,165
XEROGRAPHIC REPRODUCING APPARATUS
Filed Jan. 2, 1964  13 Sheets-Sheet 3

INVENTOR.
JOHN RUTKUS, JR.
GORDON P. TAILLIE
RALPH R. TILLY
BY
ATTORNEY

Feb. 22, 1966  J. RUTKUS, JR., ETAL  3,236,165
XEROGRAPHIC REPRODUCING APPARATUS
Filed Jan. 2, 1964  13 Sheets-Sheet 4
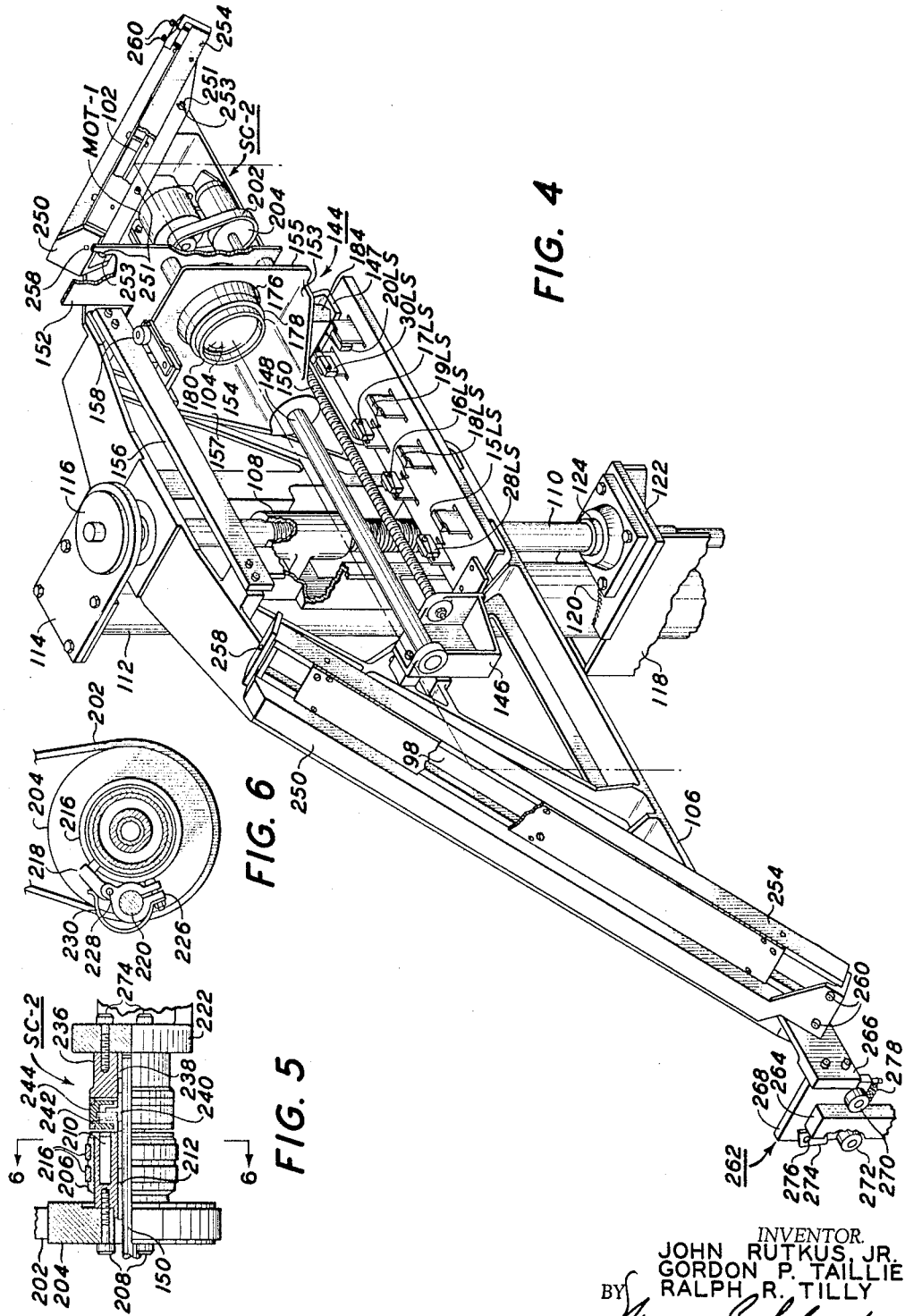
INVENTOR.
JOHN RUTKUS JR.
GORDON P. TAILLIE
RALPH R. TILLY
BY
ATTORNEY Feb. 22, 1966     J. RUTKUS, JR., ETAL     3,236,165
XEROGRAPHIC REPRODUCING APPARATUS
Filed Jan. 2, 1964     13 Sheets-Sheet 7
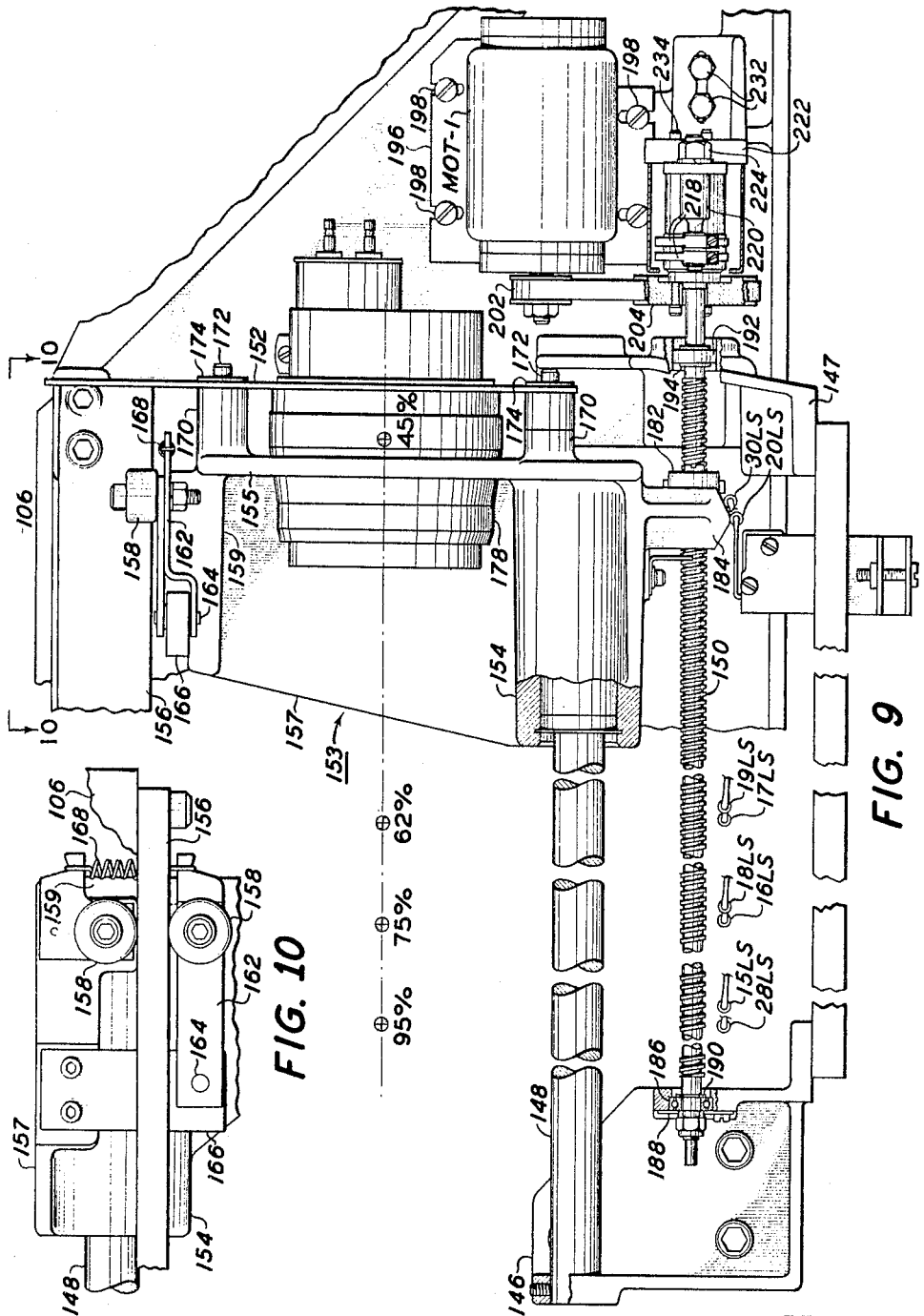
INVENTOR.
JOHN RUTKUS, JR.
GORDON P. TAILLIE
RALPH R. TILLY
BY
ATTORNEY Feb. 22, 1966    J. RUTKUS, JR., ETAL    3,236,165
XEROGRAPHIC REPRODUCING APPARATUS
Filed Jan. 2, 1964    13 Sheets-Sheet 9
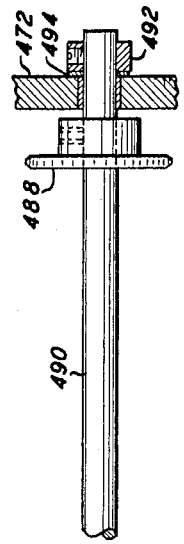
FIG. 13
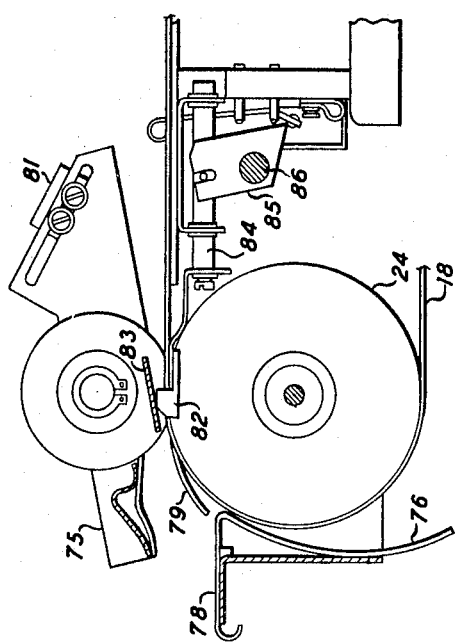
FIG. 12
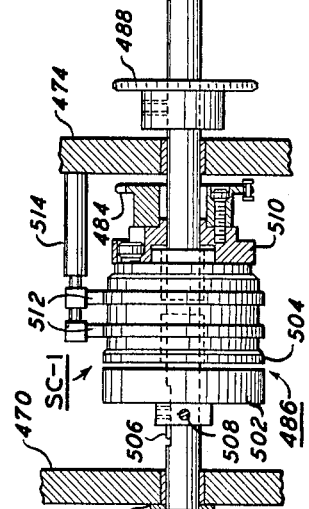
INVENTOR.
JOHN RUTKUS, JR.
GORDON P. TAILLIE
RALPH R. TILLY
BY
ATTORNEY Feb. 22, 1966 J. RUTKUS, JR., ET AL 3,236,165
XEROGRAPHIC REPRODUCING APPARATUS
Filed Jan. 2, 1964 13 Sheets-Sheet 11

INVENTOR.
JOHN RUTKUS, JR.
GORDON P. TAILLIE
RALPH R. TILLY
BY
ATTORNEY

INVENTOR.
JOHN RUTKUS, JR.
GORDON P. TAILLIE
RALPH R. TILLIE
ATTORNEY

United States Patent Office 3,236,165
Patented Feb. 22, 1966

3,236,165
XEROGRAPHIC REPRODUCING APPARATUS
John Rutkus, Jr., Penfield, Gordon P. Taillie, Rochester, and Ralph R. Tilly, Ontario, N.Y., assignors to Xerox Corporation, Rochester, N.Y., a corporation of New York
Filed Jan. 2, 1964, Ser. No. 335,055
4 Claims. (Cl. 95—1.7)

This invention relates to xerographic reproducing apparatus, and particularly to apparatus to produce xerographic copies of large documents or engineering drawings.

More specifically, the invention produces enlarged reduced, or actual size copies of documents or engineering drawings xerographically at the option of the operator. The process of xerography, and apparatus capable of producing xerographic copies from a light image, is fully disclosed in Hunt et al., Patent No. 3,078,770, issued February 26, 1963.

Although there are a variety of xerographic or electrostatic reproducing machines commercially available, they all either reproduce from microfilm or make copies from documents without enlargement or reduction other than that normally encountered in an actual size reproduction. The machines commercially available are not capable of permitting the operator to select an enlargement or reduction, nor are they capable of reproducing large documents, such as engineering drawings. They are primarily restricted to letter size or legal size documents.

It is, therefore, the principal object of this invention to improve xerographic reproducing apparatus for copying large documents.

Another object of this invention is to facilitate the reproduction of large documents by permitting automatic enlargements or reductions.

Another object of this invention is to improve xerographic reproducing apparatus so that a document to be reproduced may be moved past a scanning station at a speed proportional to the speed of a xerographic drum and a light image of the document may be reflected through an optical system onto the xerographic drum in an enlarged or reduced size proportionate to the relative speed of the document and the xerographic drum.

These and other objects of the invention are attained by means of a document conveyor positioned to move a document past a light source which scans a document and transmits a light image through a lens system to a xerographic reproducing apparatus, the control apparatus being such that the speed of the document on the conveyor is controlled in timed relation to the movement of a xerographic drum and is also coordinated with the lens system to produce a preselected enlargement or reduction of the image thus transferred.

For a better understanding of the invention, as well as other objects and further features thereof, reference is had to the following detailed description of the invention to be read in connection with the accompanying drawings, wherein:

FIG. 4 is a perspective view of the optical system of the apparatus shown in FIG. 1;

FIG. 5 is a front view, partially sectioned, of the lens drive clutch;

FIG. 6 is a sectional view of the lens drive clutch shown taken along lines 6—6 at FIG. 5;

FIG. 9 is an enlarged view of the lens and lens drive mechanism with portions broken away;

FIG. 10 is an enlarged top view of the lens guiding mechanism taken along lines 10—10 of FIG. 9;

FIG. 12 is an enlarged side view of the conveyor discharge station;

FIG. 13 is a sectional view of the xerographic conveyor drive assembly taken along lines 13—13 of FIG. 7;

Figure 1:
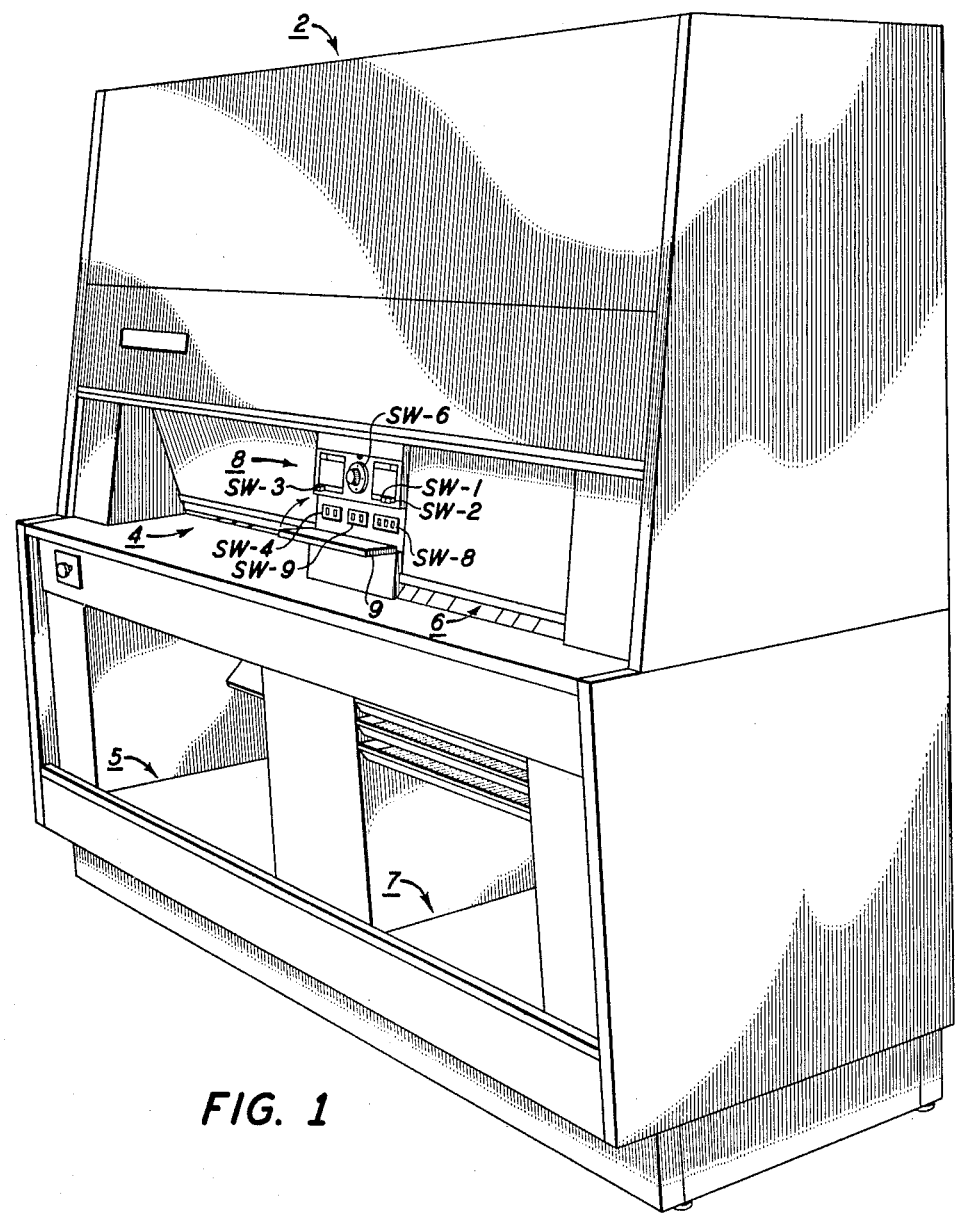
FIG. 1 is a right-hand perspective view of the xerographic apparatus of the invention enclosed in a cabinet.

A xerographic reproducing apparatus 2 with the cover panels in place is shown in FIG. 1. A document feed-in station is shown at 4 and a front document return bin is shown at 5. There is a copy sheet feed station at 6 and a copy discharge bin at 7. There is a central panel 8, the details of which are described below and a cover 9 which may be closed to partially cover part of the central panel.

Figure 2:
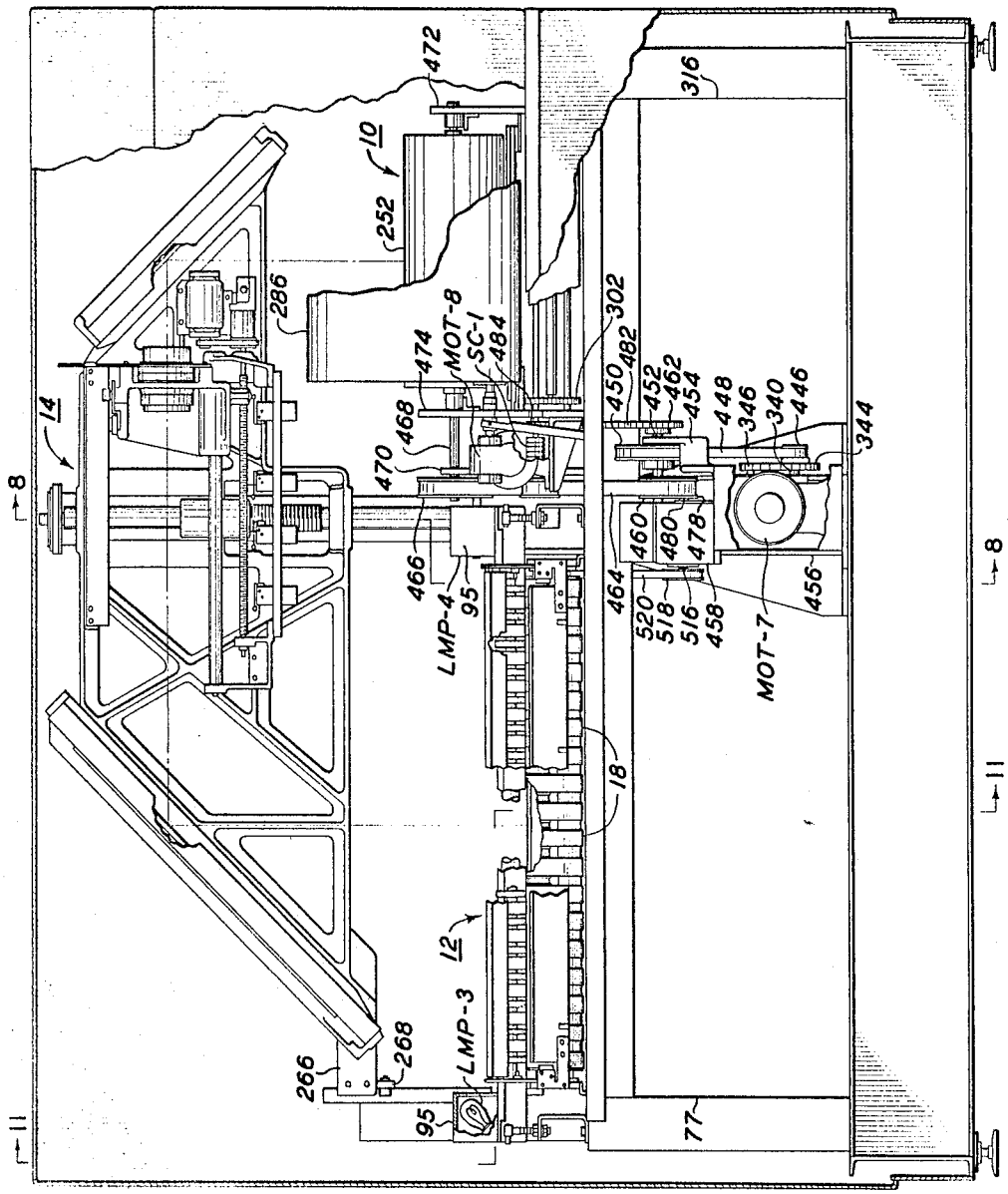
FIG. 2 is a front view of the apparatus with the cabinet covers broken away to show the internal structure of the machine.

FIG. 2 shows a front view of the machine with the covers broken away to show the internal structure of the xerographic apparatus 10, the document conveying apparatus 12, and the optic system 14.

DOCUMENT CONVEYOR

Figure 3:
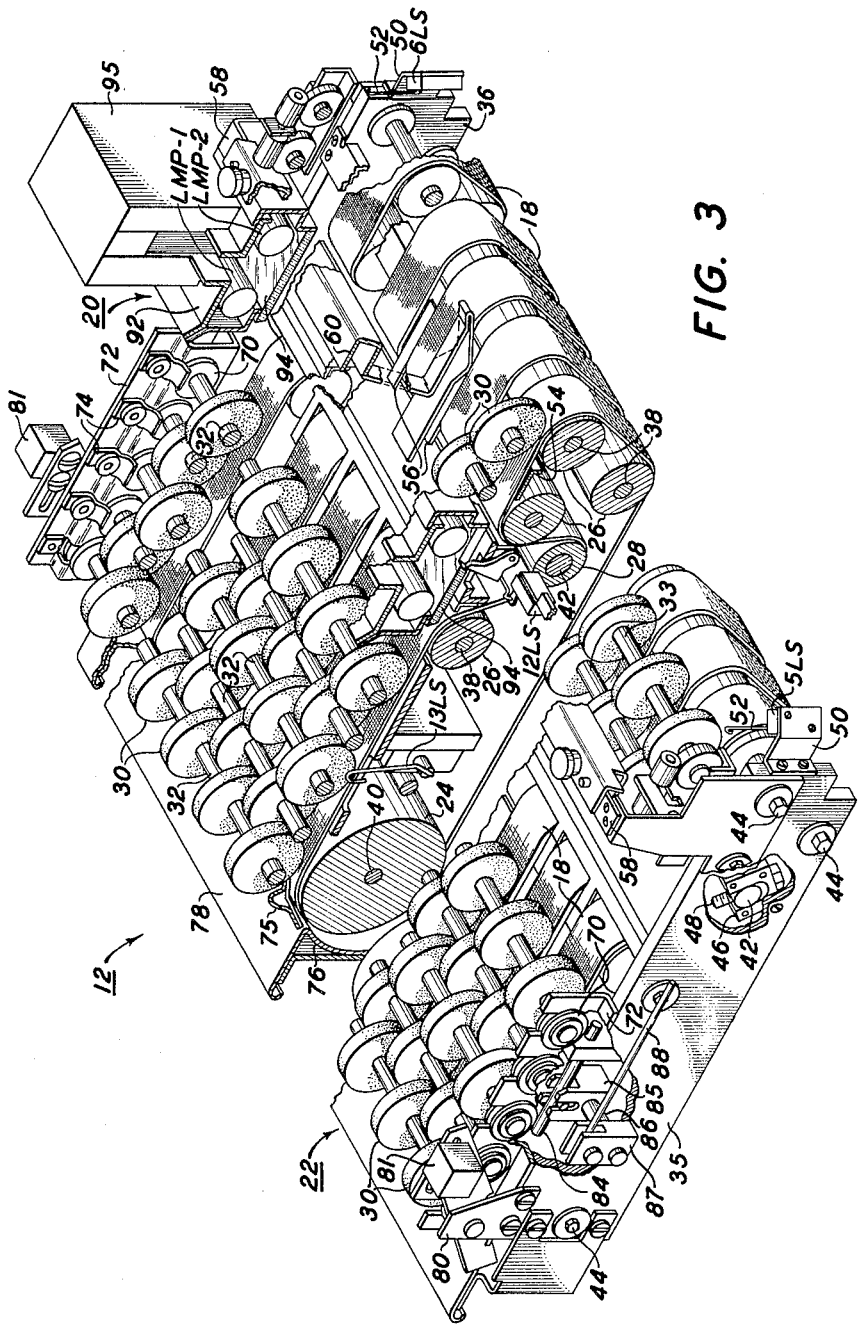
FIG. 3 is a left-hand perspective view of the conveyor system used in the apparatus shown in FIG. 1.
Figure 11:
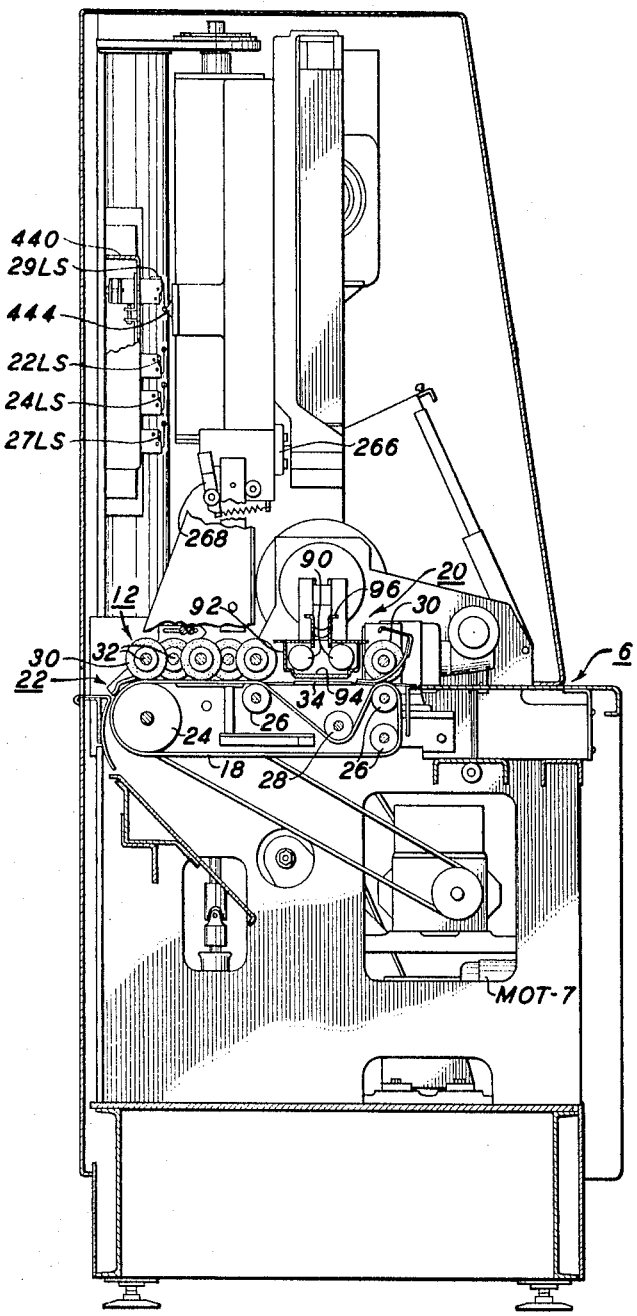
FIG. 11 is a sectional view of the apparatus taken along lines 11—11 of FIG. 2.

The document conveyor 12 is seen in FIGS. 2, 3, and 11. An original document of either transparent or opaque material is fed into the conveyor system at feed-in station 4 and is carried on conveyor belts 18 past scanning station 20 to a discharge point 22.

The conveyor belts 18 consist of a series of continuous belts driven by a drive roll 24 around a series of idler rolls 26 and a tensioning roll 28. Mounted above and in contact with the individual strands of conveyor belt 18 are a series of pressure rollers consisting of polyurethane discs 30 mounted in a staggered arrangement on a series of shafts 32. The polyurethane discs hold the document down on the conveyor belts 18 for movement through the conveyor system. A document fed into the conveyor at feed-in station 4 is gripped between the belts 18 and the first two sets of polyurethane discs 30 and moved forward across a platen 34 at exposure station 20. A document, after passing over platen 34, is again picked up by conveyor belts 18 and the polyurethane discs 30 and transported to the discharge station 22. The platen 34 has a reflective or flat white surface to reflect light that has passed through a document back through the document to reinforce the light image reflected from the document surface.

Two conveyor frame members 35 and 36 provide support for the shafts 38 supporting the idler rollers 26, shaft 40 supporting the drive roll 24, and shaft 42 supporting the tensioning roller 28. The shafts 38 and 40 are mounted in bearing assemblies 44 inside frame members 35 and 36. The shaft 42 supporting the tensioning roller 28 is mounted in a slotted adjustment block 46 mounted on the side frame members. A bolt 48 passes through the block 46 and the shaft 42 and serves to position the shaft to adjust the tension on the belts 18.

Mounted on the front of the side frame members 35 and 36 are a pair of brackets 50 supporting a pair of misfeed switches 5LS and 6LS. Actuating arms 52 extend upward from the switches and, as described below, serve to stop the conveyor if a document is misfed in such a manner as to contact either actuating arm 52, thus insuring proper alignment of a document fed into the conveyor system. A plate 54 extends across and under the conveyor belts 18 and has a series of finger-like extensions 56 which extend between the individual strands of the conveyor belt onto the platen 34. The finger-like extensions 56 are below the upper surface of the belts 18 so that a document inserted in the machine is picked up by the conveyor 18 and then is carried forward on the finger-like extensions onto the surface of the platen 34. Basically, the finger-like extensions 56 insure that the document does not follow the conveyor system beneath the surface of the platen, but, rather, guide the document up onto the surface of the platen. Mounted above the conveyor belts, on brackets 58, is a document guide 60. The document guide 60 contains finger-like members 62 which extend between the polyurethane rollers 30 onto the surface of the platen 34; thus, as the document passes between the conveyor belts 18 and the polyurethane rollers 30, it is then guided between the finger-like members 56 on the plate 54 and the finger-like members 62 on the document guide 60.

The shafts 32 which support the polyurethane rollers 30 are mounted in bearings 70 in brackets 72. The brackets 72 are mounted on the side frame members 34 and 36 and contain a series of fasteners 74 which hold the shafts 32 in position in the brackets 72.

At the rear of the conveyor at discharge station 22, there is a manually operable document deflector 75 which permits a document to be discharged from the conveyor either to the front of the machine or straight out the back of the machine. As seen in FIG. 3, when the deflector 75 is down, a document will be deflected from the front surface of the deflector downward between the roller 24 and a guide plate 76 so that it is discharged into the document tray 77 in return bin 5 at the front of the machine. If the document being reproduced is of heavy, nonflexible material which will not readily bend around the roller 24 for discharge in the front of the machine, then the document deflector 75 is elevated, as shown in FIG. 12, so that the document may proceed directly out the rear of the machine on platform 78. A resilient member 79, containing fingerlike extensions which extend between the belt strands, prevents the document from following the belts 18 around the roller 24. When the deflector 75 is in a closed position, the resilient member 79 is held down against the roller 24.

The deflector 75 is mounted on a pair of brackets 80 secured to the side plates 35 and 36 and contains counterweights 81 to facilitate movement of the deflector from a closed to an open position. Actuation of the deflector 75 is accomplished through a wedge 82 which, when moved toward the rear of the conveyor, forces a tab 83 on the deflector 75 to rotate the deflector to an open position. The wedge shaped cam 82 is actuated by a pivot block 85 secured to a shaft 86. The shaft 86 is secured in the side plate 35 and is rotated by movement of an arm 87 attached to a linkage member 88 which extends to the front of the machine to be manually actuated by an operator. Pushing the linkage 88 toward the rear of the machine forces the wedge shaped cam 82 back against the document deflector 75, raising the reflector and permitting the document to pass outward through the rear of the machine. Moving the linkage member 88 toward the front of the machine pulls the wedge shaped cam 82 away from the deflector 75 permitting the reflector to fall to a position wherein it will deflect the document downward against the guide plate 76 so that it will be accessible in the document bin 5 in the front of the machine.

As best seen in FIGS. 3 and 11, there are a pair of fluorescent lights LMP-1 and LMP-2 mounted directly above the platen 34 and encased in a housing 92. In the bottom of the housing 92, directly beneath the fluorescent lights LMP-1 and LMP-2, is a glass plate 94 and in the middle top of the housing 92, there is a light tunnel 96. The two fluorescent lights are spaced apart so that as a document passes over the platen 34, light is reflected down through the glass plate 94 onto the surface of the document and reflected from the document or from the reflective surface of the platen 34 upward through the glass plate 94 through the light tunnel 96 to the optic system of the apparatus. Two additional lights, LMP-3 and LMP-4, are mounted on the sides of the conveyor and act as fill-in lamps to illuminate the edges of large documents. The lamps are encased in housings 95, as seen in FIG. 2.

OPTICAL SYSTEM

The image reflected from the document surface passes through an optical system, shown in FIG. 4, to the xerographic side of the apparatus. The optic system consists of two front surface mirrors 98 and 102, and a positionable lens 104. The mirror 98 is an object mirror and is positioned above the scanning station at an angle to receive a light image from the scanning station through the optical system, and the mirror 102 is an image mirror positioned above the xerographic processor at an angle to receive a light image from the object mirror and the lens 104 for transmittal to the xerographic processor. Both mirrors are adjustable for alignment in the optical system and are mounted to be secured in position once properly aligned.

The optical system is mounted in a frame or casting 106, which in turn is supported by a threaded nut or sleeve 108 mounted on lead screw 110. The entire frame 106, including the mirrors and lens, may be moved in a vertical direction by rotating the lead screw 110. The entire optical frame is also supported by a column or mast 112 secured to the main frame of the machine and secured to the top of lead screw 110 by plate 114 containing bearing assembly 116. The mast 112 supports and guides the lead screw 110 by means of a frame member 118 welded to the mast at 120 and plate 122 containing thrust bearing assembly 124.

Figure 8:
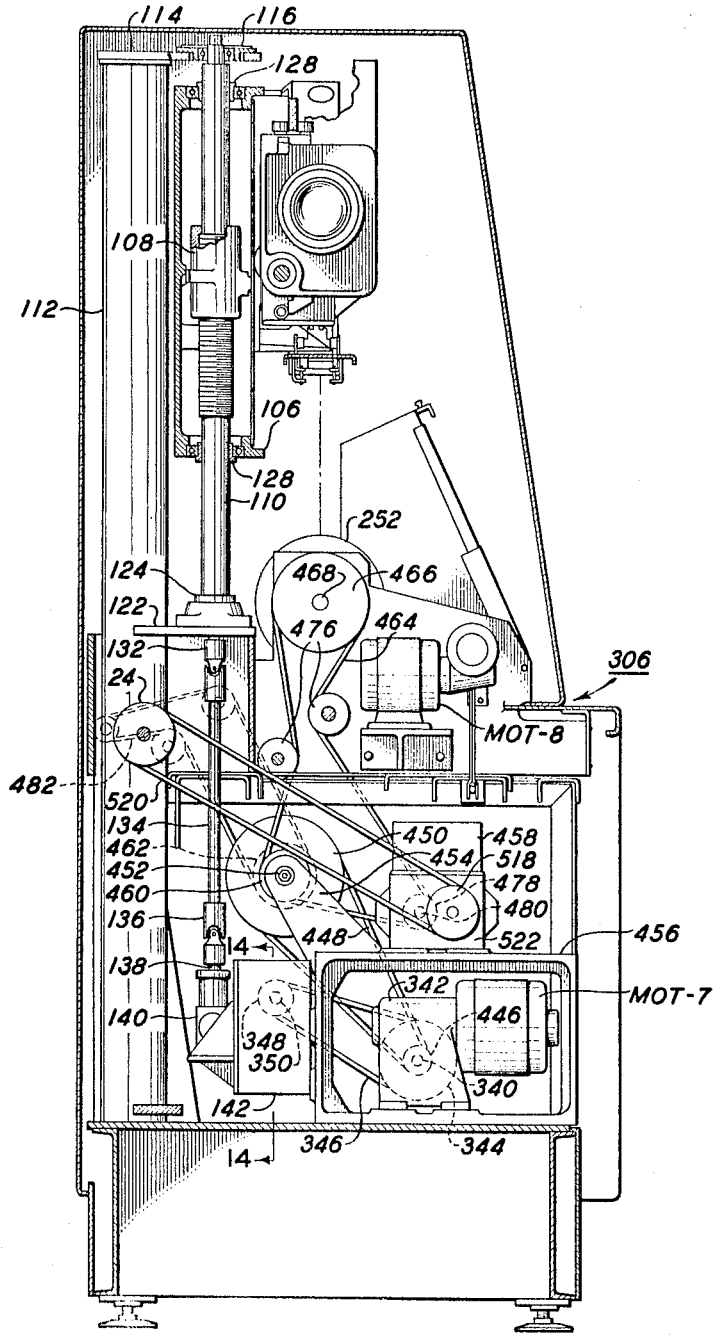
FIG. 8 is a sectional view taken along lines 8—8 of FIG. 2.

The lead screw 110 extends through the thrust bearing 124 into a universal joint 132, as seen in FIG. 8. A linkage member 134 extends between the universal joint 132 and a second universal joint 136. The second universal joint 136 is connected to a shaft 138 from a gear box 140 on the mirror drive transmission 142. The mirror drive transmission is discussed in detail below.

Mounted on the frame 106 between the mirrors 98 and 102 is a movable lens assembly 144. A pair of support brackets 146 and 147 are fastened to the frame 106 and journaled to support a guide shaft 148 and a lead screw 150. The lens assembly 144 is mounted on the guide shaft and the lead screw between the brackets 146 and 147. The lens assembly 144 consists of a lens mounting place and light shield 152, a casting 153 containing a bearing 154 on the shaft 148, and apertured plate 155, a web 157, and a flange 159. The bearing 154 is movable along the shaft 148 to position the lens assembly at any point between the two brackets 146 and 147. The lens assembly 144 is also guided by means of guide bar 156 and guide rollers 158. As seen in FIGS. 9 and 10, one of the rollers 158 is mounted on the flange 159 of the casting 153, and is rotatably mounted in pressing contact with the guide bar 156. The second roller 158 is rotatably mounted on a pivot bar 162 which forms a yoke and is pivoted about pin 164 passing through an arm 166 rigidly secured to the flange 159. The pivot bar 162 is urged toward the guide bar 156 about the pin 164 by spring 168. The spring 168 is fastened at one end to the pivot bar 162 and at the opposite end to the flange 159, thus urging the roller 158 into contact with the guide bar 156 and providing lateral support for the lens assembly 144 as it moves along shaft 148.

On the back of the apertured plate 155 of the casting 153 there are a pair of lugs 170 to which the lens mounting plate and light shield 152 is secured by means of socket screws 172 and washers 174. The light shield 152 extends upward above the lens assembly 144, as illustrated in FIG. 4, to shield extraneous light from the mirror 102. The plate 155 on the casting 153 has an aperture 176 through which the lens barrel 178 extends. The lens barrel 178 is attached to the mounting plate and light shield 152 and is optically aligned so that lens 104 receives light from mirror 98 for passage to mirror 102. The lens 104 is held in the lens barrel 178 by retaining ring 180. The lens assembly 144 is moved along shaft 148 by means of a threaded block 182 fastened to a projecting cam 184 on the bottom of the casting 153. The lens lead screw 150 passes through the threaded block 182 and through the cam 184 and is supported in the brackets 146 and 147. The end of lead screw 150 is supported on the bracket 146 by means of ball bearing 186 and retaining cap 188 and snap ring 190 and is supported in bracket 174 by means of ball bearing 192 and snap ring 194.

A lens drive motor MOT–1 is connected to the main frame 106 by bracket 196 and screws 198. Immediately beneath the motor MOT–1 and likewise attached to the frame 106 is a magnetic drive clutch and brake SC–2. The clutch SC–2 is driven by the motor MOT–1 through belt 202 to pulley 204. FIGS. 5 and 6 show cutaway views of the clutch and brake 200. A rotor assembly 206 is fastened to the pulley 204 by means of bolts 208 and contains a magnetic field 210. The rotor and pulley are mounted on a bearing 212 on the shaft of lead screw 150. The rotor and the pulley are freely rotatable on the bearing 212 about the shaft. A pair of slip rings 216 encircle the rotor to provide electrical contact between the magnetic field and electrical brushes 218. The brushes 218 are mounted on a support rod 220 which in turn is fastened to a bracket 222 by bolt lug 224. The brushes 218 are supported on the rod 220 by clamp 226 which contain a pivot point 228 and a leaf spring 230, which pivots the brushes about the point 228 into contact with the slip rings 216. The bracket 222 is mounted on the optical frame 106 by lugs 232 and supports the entire clutch assembly SC–2 by means of lugs 234 which extends through the bracket 222 to a stationary brake member 236. The shaft 150 extends into the brake member 236 and is rotatably journaled therein in bearing 238.

A collar 240 is suitably secured to the shaft 150, as, for example, by keying, at a point along the shaft between the rotor 206 and the brake member 236. The collar 240 contains a metal diaphragm 242, which is attached to the armature 244 of the electro clutch 200. Electric current to the magnet 210 sets up a magnetic field which attracts the armature 244 pulling the armature forward against the action of diaphragm 242 until it is in contact with the rotor 206. Motion is then transmitted from the motor MOT–1 to the belt 202, the pulley 204, the rotor 206 to the armature 244. Rotation of the armature 244 produces rotation of the shaft 150 and the lead screw 150 resulting in movement of the lens assembly 144. When power is cut off from the magnet 210, the diaphragm 242 pulls the armature back away from the rotor 206 into contact with the brake member 236, which, since it is secured to the bracket 222, provides a braking action for the movement of the shaft 150 and the lens assembly 144.

The guide shaft 148 and the lead screw 150 are constructed at an angle of approximately twenty-six minutes with a vertical plane passing through the two mirrors 98 and 102. When the leading edge of a document to be reproduced passes the scanning station, the reflected light image of the document is placed on the xerographic drum surface so that it will ultimately appear as a developed image in a predetermined point on the copy sheet passing through the xerographic side of the machine. As the lens assembly 144 is moved to the right along the shaft 148, the light image appearing on the xerographic drum surface is reduced and, consequently, the relative position of the light image of the leading edge of the document is moved to a different position on the drum surface. The amount of variance of the leading edge of the light image on the xerographic drum surface is determined by the amount of reduction of the original document being reproduced. Thus, if the lens assembly 144 is at the extreme left-hand position of the guide shaft 148, and this is taken as the reference position upon which the leading edge of the document strikes the xerographic drum surface, then the movement of the lens assembly to the right on shaft 148 produces a correspondingly increasing departure of the light image from that original position. By angling the shaft 148 and the lead screw 150 so that the lens 144 does not travel in a plane containing the two mirrors, but rather in a plane at an angle of approximately twenty-six minutes to the plane of the two mirrors, then the leading edge of the document will be reproduced at approximately the same position on the xerographic drum's surface and, consequently, in the same relative position on the final copy sheet.

The position of the lens assembly is controlled by a series of switches 15LS–20LS and two override switches 28LS and 30LS, shown in FIGS. 4 and 9 and described herein under "Machine Operation." The switches are actuated by cam 184 on the bottom of the lens assembly and stop the lens assembly at the position desired.

Mounted on each side of the optical frame 106 there is a mirror support casting 250 mounted at 45° to the horizontal and optically aligned with the document in the conveyor 12, the lens 104, and the xerographic drum 252 so that a light image is reflected from the document surface onto the mirror 98 through the lens 104 to the mirror 102 and the xerographic drum 252. The mirrow castings 250 are supported on the frame 106 by means of bolts 251 in slotted grooves 253 and a centrally located pin through the casting and the frame. The pin is not shown in the drawings but is mounted in the side of the casting 250 so that the entire mirror assembly is rotatable about the pin member. For optical alignment purposes, the bolts 251 may be loosened and the casting 250 rotated about the pin member with a limited degree of movement being provided by the slots 253.

The casting 250 supports a housing 254 containing the mirrors 98 and 102. The housing 254 is supported in the casting 250 by means of a pin 258 on each end of the casting which is secured in the casting and loosely journalled in the housing 254. Adjustment screws 260 at one end of each casting 250 press downward on the housing 254 to prevent rotational movement of the housing about the pin 258. Adjustments may be made to the adjustment screws 258 to optically align the mirrors about an axis which runs through the pins 258.

The entire optical frame 106 is guided for movement along the lead screw 110 by means of a guide assembly 262 located on the conveyor side of the apparatus. An upright guide 264 is supported from the main frame of the apparatus and extends upward to a point sufficient to guide the optical frame 106 along its entire path of travel. A support member 266 is fastened to the optical frame 106 at one end thereof and to a second member 268 containing a roller assembly and positioned at right angles to the support member 266. The member or plate 268 contains a stationary roller 270 and a movable roller 272 which cooperates with guide 264 in the same manner as previously described for the lens guide rollers 158 and the lens guide bar 156. The roller 270 is pivotally mounted on the member 268 in contact with the guide 264.

The roller 272 is rotatably mounted on a pivot member 274 which is pivotally secured to the plate 268 by pin 276. A spring 278 is secured at one end to the plate member 268 and at its other end to the pivot member 274 urging the pivot member 274 about pin 276 and the roller 272 into rolling contact with the guide 264.

XEROGRAPHIC APPARATUS

The xerographic or reproducing side of the apparatus receives a light image of the document being passed through the conveyor system 12 by means of the optical system 14 and converts that light image into a powder image and transfers the powder image to a sheet of support material, usually paper, and provides a permanent bond of the powder image to the paper surface. Suitable xerographic apparatus for use in this machine is disclosed in detail in Patent No. 3,078,770, issued to R. A. Hunt et al. on February 26, 1963, entitled "Xerographic Reproducing Apparatus." For a detailed explanation of the apparatus, reference is had to the above-entitled patent; however, for purposes of this invention, reference is had to FIGS. 2 and 7 and the following brief description of the xerographic apparatus.

The xerographic apparatus comprises a xerographic plate including a photoconductive layer or light receiving surface on a conductive backing and formed in the shape of a drum 252. The drum is journaled in the frame to rotate in the direction indicated by the arrow to cause the drum surface sequentially to pass a plurality of xerographic processing stations.

The several xerographic processing stations in the path of movement of the drum surface may be described functionally as follows:

A charging station in which a uniform electrostatic charge is deposited on the photoconductive layer of the xerographic drum;

An exposure station at which a light or radiation pattern of copy to be reproduced is projected onto the drum surface to dissipate the drum charge in the exposed areas thereof and thereby form a latent electrostatic image of the copy to be reproduced;

A developing station at which a xerographic developing material, including toner particles having an electrostatic charge opposite to that of the electrostatic latent image, is cascading over the drum surface, whereby the toner particles adhere to the electrostatic latent image to form a xerographic powder image in the configuration of the copy to be reproduced;

A transfer station, at which the xerographic powder image is electrostatically transferred from the drum surface to a transfer material or support surface; and, A drum cleaning and discharge station at which the drum surface is first charged and then brushed to remove residual toner particles remaining thereon after image transfer, and at which the drum is exposed to a relatively bright light source to effect substantially complete discharge of any residual electrostatic charge remaining thereon.

The charging station is preferably located as indicated by reference character A. In general, the charging apparatus or corona charging device 284 includes a corona discharge array of one or more discharge electrodes that extend transversely across the drum surface and are energized from a high potential source and are substantially enclosed within a shielding member.

Next subsequent thereto in the path of motion of the xerographic drum is an exposure station B. This exposure station receives the light image from the document being reproduced and permits that light image to be sequentially placed on the drum surface in timed relation to the movement of the original document through the document conveyor. A light image of the copy being reproduced is reflected from the mirror 102 through a slot aperture 280 in a light shield 282 onto the xerographic drum 252.

Adjacent to the exposure station is a developing station C, in which there is positioned a developer apparatus 286 including a developer housing 288 having a lower or sump portion for accumulating developer material 290. Mounted within the developer housing is a bucket type conveyor 292 to carry the developer material to the upper portion of the developer housing from where the developer material is cascaded over a hopper chute 294 onto the drum.

As the developer material cascades over the drum, toner particles of the developer material adhere electrostatically to the previously formed electrostatic latent image areas on the drum to form a visible xerographic powder image, the remaining developer material falling off the peripheral surface of the drum onto the bottom of the developer housing. Toner particles consumed during the developing operation to form the xerographic powder images are replenished by a toner dispenser 296, of the type disclosed in Hunt Patent No. 3,013,703, issued December 19, 1961, mounted within the developer housing and driven by a motor through a suitable drive mechanism.

Any developer material not caught within the developer housing as the developer material falls from the drum is caught by a pan 298 suitably positioned beneath the developer housing. As a supply of developing material accumulates in this pan, it is manually removed by the operator and it may be returned to the reservoir in the developer housing.

Positioned next adjacent to the developing station is the image transfer station D, which includes suitable sheet feeding mechanisms adapted to feed sheets of support or transfer material, usually paper, successively to the xerographic drum in registration with the formed xerographic powder image on the xerographic drum. In the embodiment shown, the sheet feeding mechanism includes a chain conveyor 302 carrying a pair of paper grippers 304 in a circuit between sheet receiving and sheet delivery stations, means being provided to acuate the paper grippers to cause the paper grippers to take hold of the front or leading edge of a sheet of support material inserted into the machine and to hold the sheet while traveling to the delivery station and there to release the sheet for discharge from the machine.

In the embodiment shown, a sheet of transfer material is fed manually by an operator to a paper gripper 304 at sheet feed-in station 306 and is forwarded by the paper gripper into contact with the xerographic drum.

The transfer of the xerographic powder image from the drum surface to the support material is effected by means of a corona transfer device 308 that is located at or immediately after the point of contact between the support material and the rotating drum. The corona transfer device is substantially similar to the corona device 284 that is employed at charging station A, in that it includes an array of one or more corona discharge electrodes that are energized from a suitable high potential source and extend transversely across the drum surface and are substantially enclosed within a shielding member. In operation, the electrostatic field created by the corona discharge device is effective to tack the transfer material electrostatically to the drum surface, whereby the transfer material moves synchronously with the drum while in contact therewith. Simultaneously with the tacking action, the electrostatic field is effective to attract the toner particles comprising the xerographic powder image from the drum surface and cause them to adhere electrostatically to the surface of the transfer material.

As the paper gripper is advanced by the chain conveyor, it will strip the sheet of transfer material from the drum and transport it to a suitable fixing device, such as heat fuser 310, whereat the xerographic powder images previously transferred to the sheet are permanently fixed thereto. There are suitable rods 312 provided to guide the trailing edge of the sheet of support material in a path adjacent to the heat fuser. The heat fuser 310 contains suitable electrical heating elements R-1, R-2, and R-3 connected to a suitable source of power to provide the necessary heat to fuse the powder image to the support material surface.

After fusing, the finished copy is discharged from the apparatus at discharge point 314 from which it falls to a hopper 316 at the front of the apparatus. To accomplish this, there is provided a pair of delivery rollers 318 and 320 which receive the sheet from the paper gripper and deliver it to a paper chute 322.

The next and final station in the device is a drum cleaning station E, having positioned therein a corona pre-cleaning device 324 similar to the corona charging device 284. An electrostatic charge is imposed on the drum and powder adherent thereto aid in effecting removal of the powder. A rotatable brush 326 rotates in contact with the drum surface to effect the removal of the residual powder from the drum, and a light source LMP4 floods the drum surface with light to cause the dissipation of any residual electric charge remaining on the xerographic drum.

For collecting powder particles removed from the brush, there is provided a dust hood 328 that is formed to encompass approximately two-thirds of the brush area. For removing dust particles from the brush and the dust hood, an exhaust duct 330 is arranged to cover a slot that extends transversely across the dust hood 328 and is connected to a filter bag 332 in a filter box 334. Motor driven fan units 336 connected to the filter box produce a flow of air through the filter box drawing air through the area surrounding the xerographic drum and the dust hood entraining powder particles removed from the drum by the brush. Powder particles are separated from the air as it flows through the filter bag so that only clean air reaches the motor fan unit.

The operation of the xerographic apparatus is discussed below in conjunction with the entire machine operation.

DRIVE SYSTEM

Figure 16:
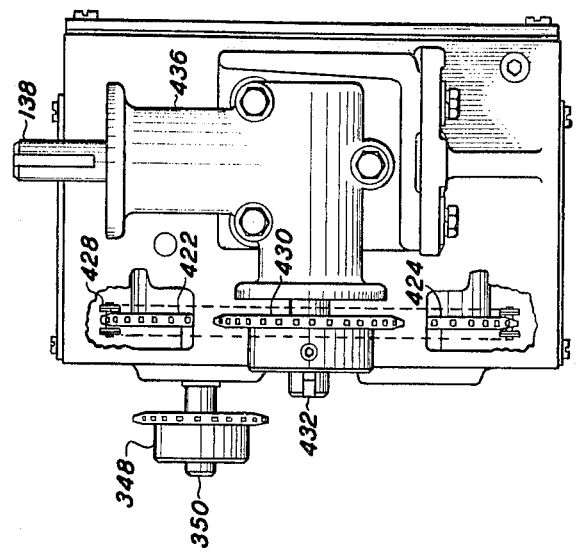
FIG. 16 is a rear view of the mirror drive transmission.

FIGS. 2, 8 and 11 show the drive system for the conveyor, the optics, and the xerographic equipment. The motor MOT-7 is the main drive motor of the apparatus and supplies power to drive the xerographic drum 252, the xerographic chain conveyor 302, the document conveyor drive roll 24, and the optical assembly 14. The motor MOT-7 is mounted at the bottom of the machine on a support bracket mounted on the main frame. The output shaft of the motor drives a power shaft 340 through a gear box 342. A large pulley 344 is mounted on the shaft 340 and drives a belt or chain 346. The belt 346 conveys power to the mirror drive transmission 142 by means of pulley 348 mounted on the input shaft 350 of the mirror drive transmission. The mirror drive transmission 142 is shown in detail in FIGS. 14, 15 and 16.

Figure 14:
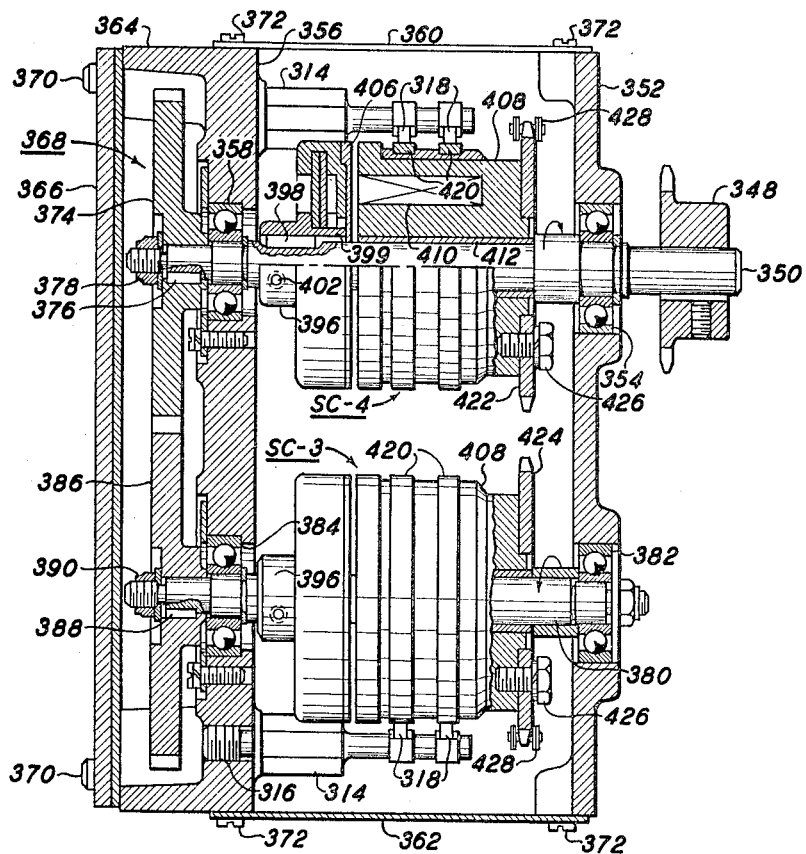
FIG. 14 is a sectional view of the mirror drive transmission taken along lines 14—14 of FIG. 8.
Figure 15:
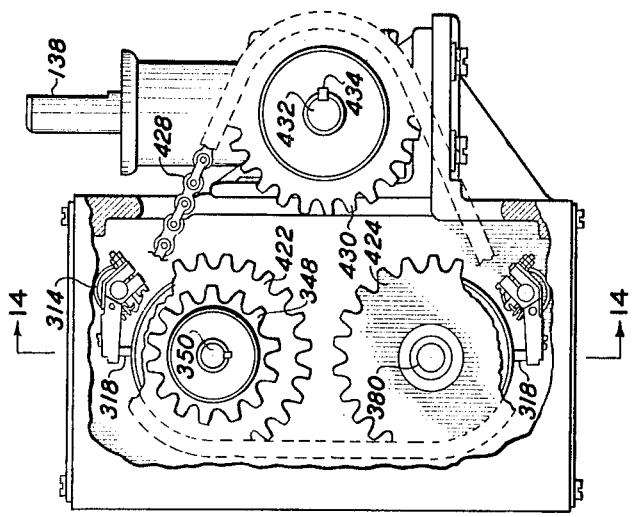
FIG. 15 is a side view of the mirror drive transmission with the external covers broken away to show the internal gearing of the mechanism.

As seen in FIG. 14, the power input shaft 350, containing the sprocket 348, extends through a side wall 352 and is journaled in the side wall by ball bearings 354. The shaft extends through the mirror drive transmission to the opposite wall 356 wherein it is journaled in ball bearing 358 and extends through the wall 356. The space between the walls 352 and 356 is enclosed by a top plate 360 and a bottom plate 362. The side wall 356 contains an extended portion 364 about the periphery forming, in conjunction with the side wall 356 and a side cover plate 366, an enclosed gear box 368. The side cover 366 is removably mounted on the extended periphery 364 of the side wall 356 by means of bolts or lugs 370, thus providing access to the interior of the gear box 368. The top cover 360 and the bottom cover 362 are removably secured to the side walls 356 and 352 by means of screws 372 providing access to the interior of the mirror drive transmission. A gear 374 is mounted on the end of the shaft 350 that extends through the wall 356 into the gear box 368. The gear 374 is rotatably secured to the shaft 350 by means of key 376 and is held on the shaft 350 by means of nut 378 on a threaded portion of the end of shaft 350.

A second shaft 380 is journaled for rotation in ball bearings 382 and 384 in side walls 352 and 356, respectively, beneath the input shaft 350. The shaft 380 is freely rotatable and also extends through the wall 356 into the gear box 368. A second gear 386 of the same size as gear 374 is mounted, in the gear box 368, on the end of shaft 380 by means of key 388 and nut 390 in the same manner as gear 374. The gears 374 and 386 mesh to impart motion from the input shaft 350 through the gear 374 to the gear 386 and to the shaft 380. This particular arrangement provides rotational movement of two shafts in opposite directions, that is, if the ends of the shafts are viewed from the left-hand side of FIG. 14, looking into the gears 374 and 386, the upper or input shaft 350 rotates in one direction, say, counterclockwise, then the second shaft 380 will have a rotational movement in a clockwise direction. Therefore, the mirror and optics assembly 14 may be driven in an upward or a downward direction by taking the driving motion either from the shaft 350 or the shaft 380.

Mounted in the mirror drive transmission 142 between the walls 352 and 356 and on the shafts 350 and 380 are a pair of magnetic clutches generally indicated as SC-3 and SC-4, respectively. The two magnetic clutches are identical in construction so that, for purposes of simplicity, only the clutch SC-4, shown in section view, will be described herein. The clutch construction consists basically of an armature 396 mounted on the shaft 350 for rotational movement therewith by means of key 398 and key way 399. Lateral movement along the shaft is restricted by means of a pair of set screws 402, one of which is shown. A clutch plate member 404 is mounted on the armature 396 by means of a resilient metallic diaphragm 406. A rotor 408, containing an electromagnet 410, is mounted on a sleeve bearing 412 for independent rotation of the shaft 350.

A pair of support arms 314 are secured to the side walls 356 by lugs 316 and contain mounted thereon a pair of electrical brushes 318 in electrical contact with conductive rings 420. The brushes 318 supply electrical current to the electromagnet 410 through the rings 420 during rotation of the rotor 408. When current is supplied to the electromagnet 410, a magnetic field is set up which attracts the clutch plate 406 and pulls it against the action of diaphragm 404 up against the rotor 408, providing the clutch action necessary to drive the rotor 408 from either the shaft 350 or 380 through the armature 396, the clutch plate 404 to the rotor 408. When the electrical contact is broken, the field and the electromagnet are cut off and the diaphragm 404 pulls the clutch plate 406 away from the rotor 408, removing any driving action from the rotor.

Each of the magnetic clutches SC-4 and SC-3 have a sprocket 422 and 424, respectively, secured to the rotor 408 by means of three bolts 426, only one of which is shown.

A chain 428 engages both sprockets 422 and 424 and a third sprocket 430 secured to a shaft 432 by a key 434. Motion imparted to either of the sprockets 422 or 424 by the magnetic clutches SC-3 or SC-4 is relayed to the sprocket 430 in the shaft 432 by means of the chain 428. The shaft 432 enters a gear box 436 wherein the rotary motion set up in shaft 432 is used to produce a corresponding rotary motion in shaft 138 by means of a standard set of bevel gears, as is well known in the art. As previously described, the shaft 138 is connected to a linkage member 134 by means of a universal joint 136 so that the rotary motion of the shaft 138 is imparted to the lead screw 110 of the optic system 14.

Operation of the magnetic clutches SC-3 and SC-4 is controlled by a series of eight switches. 21LS through 26LS and two override switches 27LS and 29LS. The override switches and two of the positioning switches are shown in FIG. 11. The other four positioning switches cannot be seen in FIG. 11 since they are parallel with the switches shown. The switches are adjustably mounted on a bracket 440 and vertically positioned to control the stopping point of the mirror assembly for the proper reduction of the document being reproduced. The switches are horizontally positioned in the bracket 440 so that their actuating arms are contacted by a cam 444 extending outward from the back of the optical frame or casting 106. As the whole optical assembly 14 is moved upward or downward, the cam 444 successively contacts the actuating arms of the switches and, depending upon the particular document reduction desired by the operator, the magnetic clutch and the mirror drive transmission 142 will be deenergized, as described below with respect to the overall operation of the apparatus.

The shaft 340 from gear box 342 of motor MOT-7 contains in addition to sprocket 344, a pulley 446, which drives belt 448. Belt 448 transmits power from the motor MOT-7 to pulley 450 on shaft 452. The shaft 452 is rotatably supported by a pair of arms 454 mounted on inner support frame 456. The inner support frame 456 also supports a document drive transmission 458. The shaft 452 is rotated by pulley 450 and belt 448 and contains a second pulley 460 and a sprocket 462 mounted thereon. The pulley 460 transmits power from the shaft 452 to a xerographic drum drive belt 464. Belt 464 transmits power to the xerographic drum 252 by means of pulley 466 mounted on shaft 468, which in turn is coupled with the xerographic drum 252. Shaft 468 is rotatably journaled in the xerographic frame plates 470 and 472 and an interior frame plate 474. The belt 464 is tensioned by two idler rollers 476 and extends around a pulley 478 on the power input shaft 480 of the document drive transmission 458, thus supplying power to the document drive transmission. It is obvious from the foregoing that the xerographic drum is driven at a constant speed druing the time that the motor MOT-7 is in operation, and the input to the document drive transmission 458 is also driven at a speed proportional to the speed of the xerographic drum.

The sprocket 462 on shaft 452 drives the paper conveyor system of the xerographic apparatus through chain 482 to sprocket 484 and to delivery roller 320. The chain 482 is driven during operation of the motor MOT-7 in the same manner as the xerographic drum drive; however, the paper conveyor of the xerographic apparatus is operated intermittently in conjunction with the operation of the document conveyor 12. The intermittent operation of the paper conveyor is accomplished through a clutch 486, shown in detail in FIG. 13.

Figure 7:
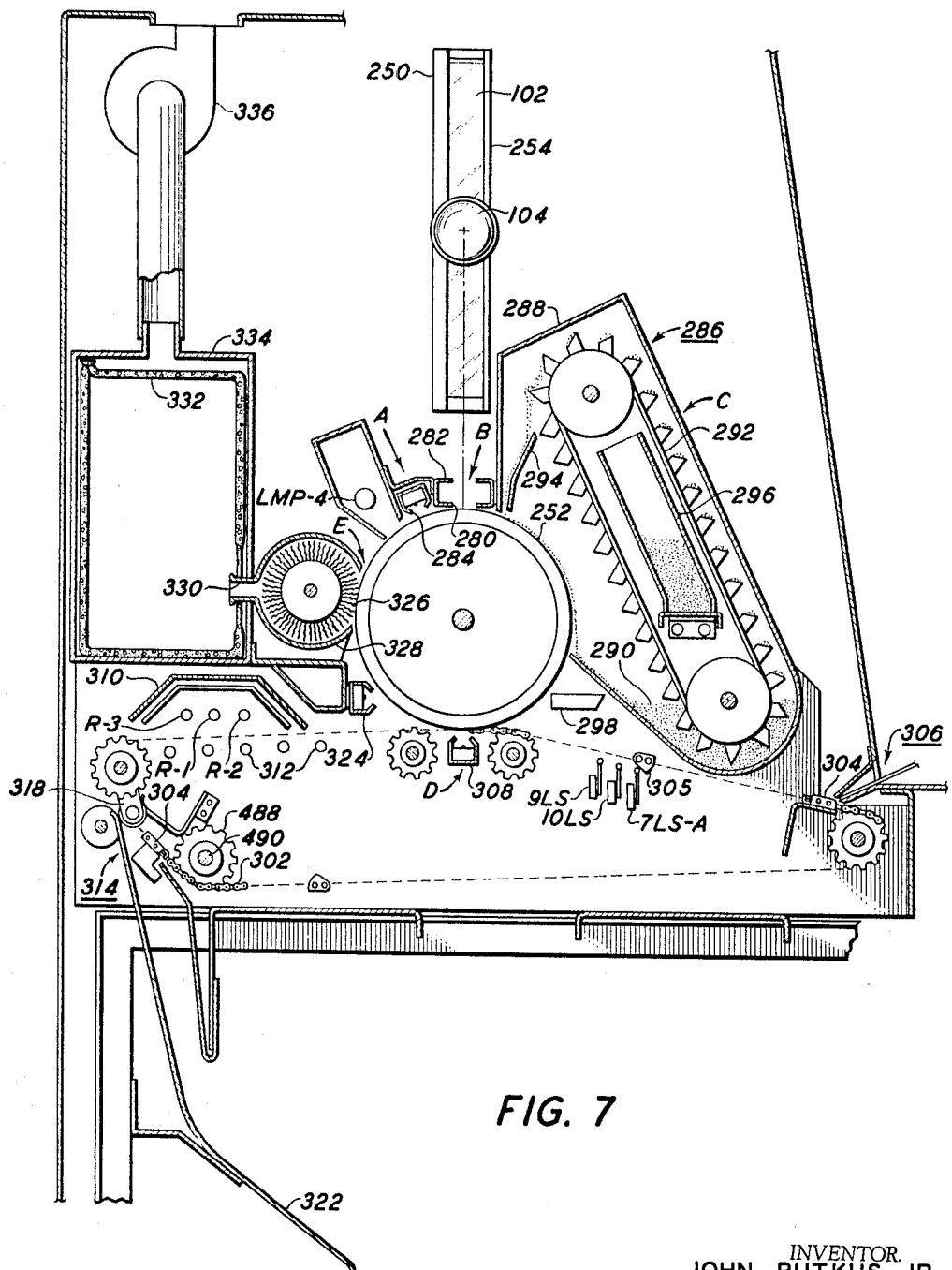
FIG. 7 is a schematic view of the xerographic apparatus used in the machine shown in FIG. 1.

A sheet material conveyor suitable for use herein is described in detail in Patent No. 3,078,770, issued to R. A. Hunt et al. on February 26, 1963. Therefore, the following general description of the conveyor and clutch mechanism is sufficient for this disclosure. As seen in FIG. 7, the roller chains 302 carrying the paper grippers 304 are driven by drive sprockets 488 secured to drive shaft 490, which is rotatably journaled in frame plates 470, 472 and 474. Drive shaft 490 is maintained axially in position at one end by a collar 492 and thrust washer 494, and at its other end by thrust washer 496 and retaining ring 498, the latter being inserted in a suitable groove formed in the drive shaft. Drive shaft 490 is driven by sprocket 484 through a conventional magnetic clutch SC-1. The magnetic clutch includes two clutch plates 502 and 504.

Clutch plate 502 is secured to the drive shaft 490 for rotation therewith by key 506 and screws 508 threaded in the hub of clutch plate 502. The clutch plate 504 is journaled by suitable bearings on the drive shaft and carries a clutch adapter 510 supporting sprockets 484 driven by chain 482, as previously described. Thus, clutch plate 504 is free to rotate about the axis of the drive shaft while the clutch plate 502 remains stationary due to friction of the elements attached thereto.

The magnetic clutch is connected to a suitable source of power, as described hereinafter, through brushes 512 bearing on suitable collector rings on clutch plate 504, the brushes being secured to, and insulated from, the frame plate 474 by bracket 514. When power is supplied to an electromagnet within clutch plate 504, through brushes 512, the magnetic field set up closes the rotating clutch face of clutch plate 504 against the clutch plate 502 transmitting power from the sprocket 484 through the clutch SC-1 to the shaft 490 transmitting the necessary drive to the conveyor chains 302 and gripper bars 304.

As previously indicated, power is supplied from the motor MOT-7 through belt 448, the xerographic drum drive belt 464 to the input shaft 480 of the document drive transmission 458. The output shaft 516 of the document drive transmission is seen in FIG. 2, and has pulley 518 mounted thereon. A belt 520 transmits power from the document drive transmission 458 to the document drive roll 24 which moves the belt system of the conveyor 12, as previously described, to carry a document through the exposure station. The movement of a document through the document conveyor 12 must be proportional in speed to the movement of the xerographic drum 252. That is, assuming a one-for-one size reproduction of a document, the conveyor would have to move the document at the same linear speed as the surface of the xerographic drum 252. Assuming that there were to be a fifty percent reduction in the size of the copy from the original document, the document conveyor would necessarily move at twice the speed of the linear movement of the surface of the xerographic drum. Therefore, the document drive transmission must accurately synchronize the movement of the xerographic drum and the conveyor system and must be capable of selectively producing variations in the ratio of the document speed to the drum speed.

A document drive transmission of the type suitable for use herein is disclosed in copending application, Serial No. 299,416, filed August 1, 1963, in the names of E. D. Hewes, R. R. Tilly, and J. O. Wilson.

MACHINE OPERATION

Figure 17:
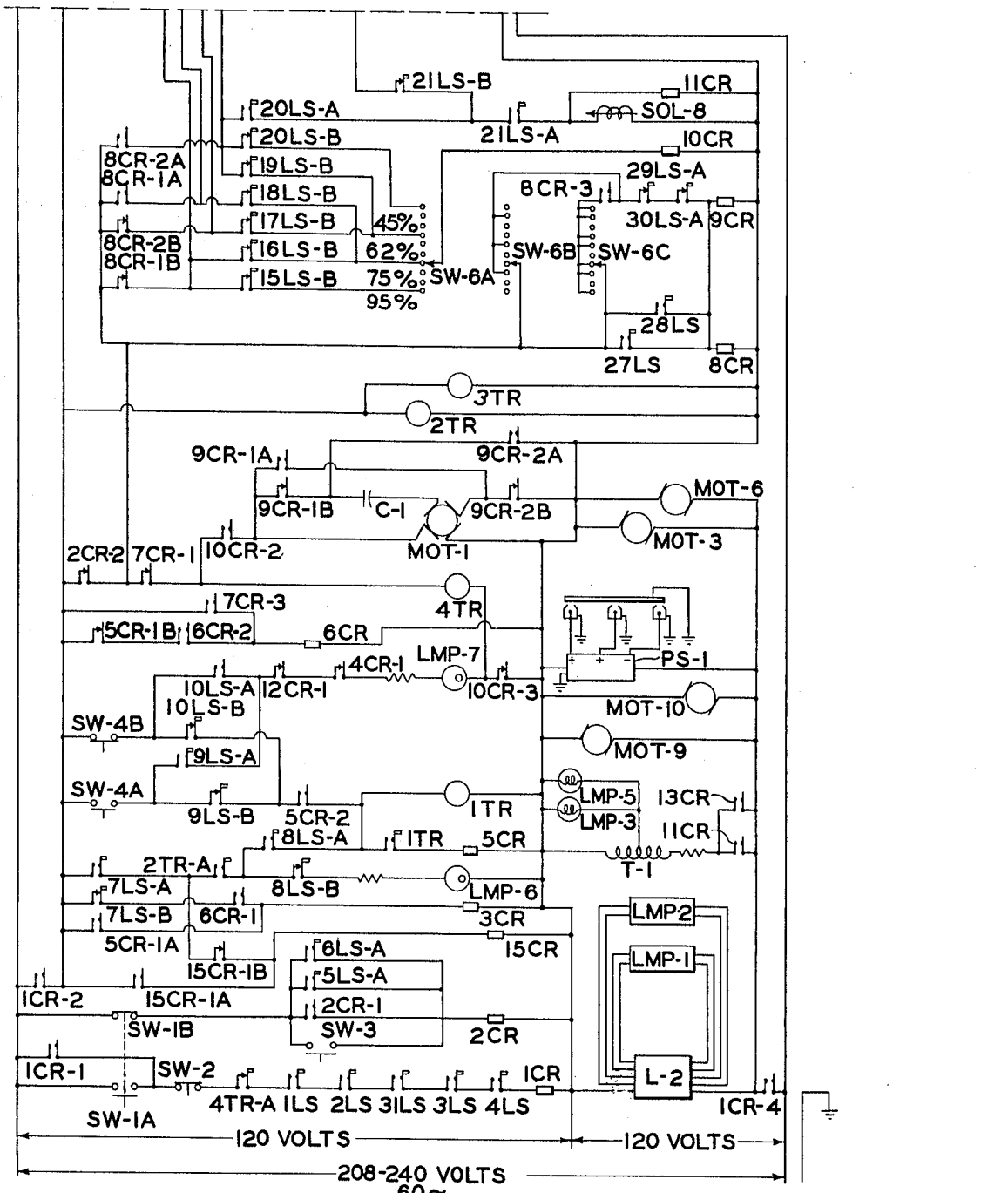
FIGS. 17 and 18 are schematic electrical wiring diagrams of the apparatus.
Figure 18:
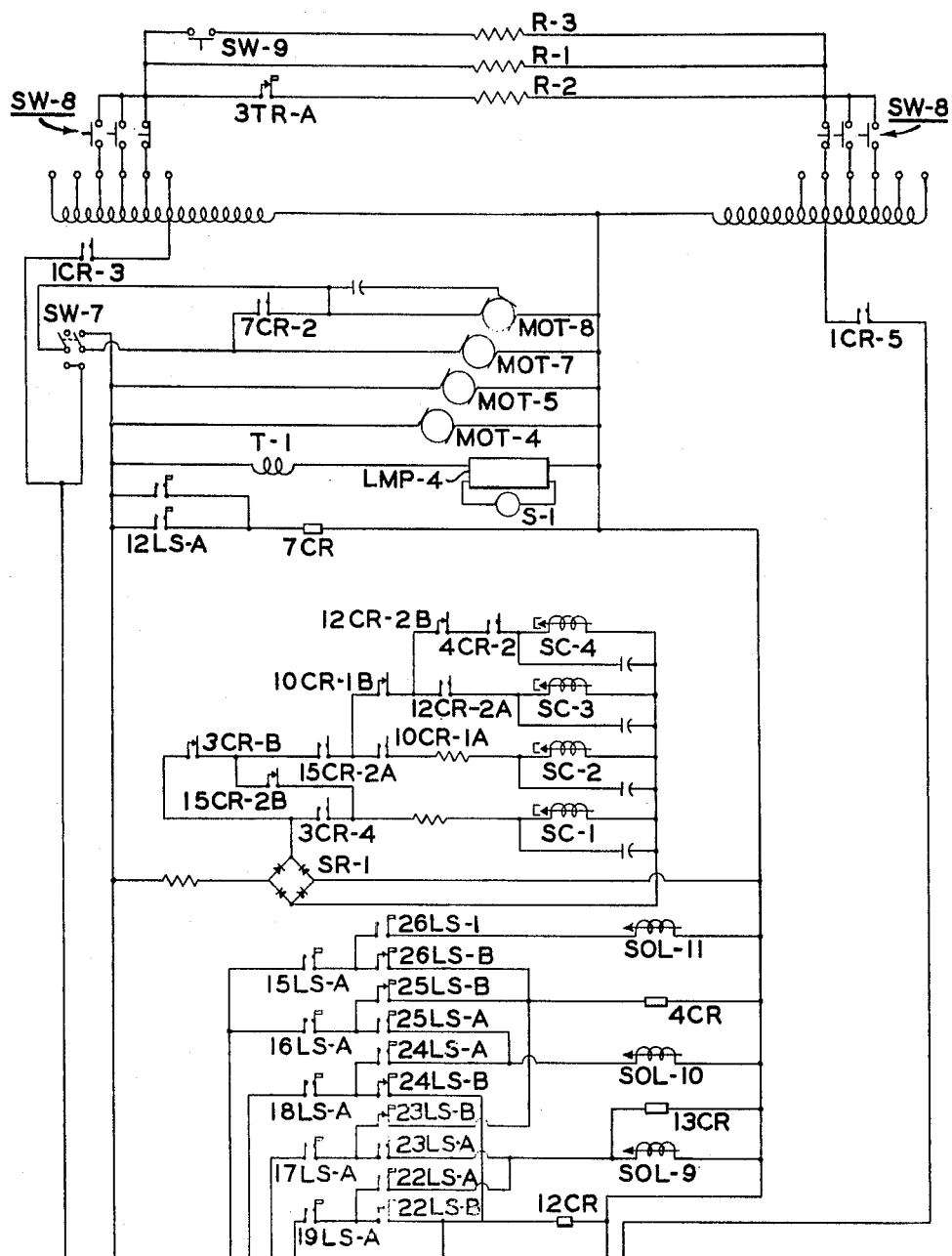

A clearer understanding of the operation of the machine can best be obtained by reference to the schematic wiring diagram, FIGS. 17 and 18, the control panel in FIG. 1, and the following description.

Before the apparatus may be actuated, the doors of the cabinet must be closed to actuate the interlock switches 1LS, 2LS, 3LS and 4LS, mounted on the cabinet frame. These interlock switches are used so that the machine may be operated only when the doors of the cabinet are closed. A further interlock switch 31LS is positioned on the conveyor lamp housing to be actuated by closing the lamp housing. These provisions are made not only from the standpoint of safety, but also to insure proper circulation of air through the interior of the machine to dissipate heat generated by the apparatus and to assure proper illumination of any document passing through the machine.

The paper gripper 304 must be in a position to receive a sheet of support material before a reproduction is made. For that purpose, a switch actuator 305 on the paper conveyor contacts an end-of-cycle limit switch 7LS-A to stop the paper conveyor with a paper gripper at the receiving station ready to receive a sheet of support material.

The entire machine is originally energized by momentarily closing a main power switch SW-1 connecting the assembly to a suitable source of power such as a commercial 220 volt alternating current outlet. Switch SW-1 is a manually operable, mechanically interlocked switch having contacts SW-1A, SW-1B and SW-1C. Switch SW-1A is momentarily closed by depressing the button on the control panel marked "ON." At the same time, the contacts SW-1B are momentarily opened.

Upon closure of switch SW-1A, control relay 1CR is energized to close its contacts 1CR-1, 1CR-2, 1CR-3, 1CR-4 and 1CR-5. With the closure of contact 1CR-1, the switch SW-1A may be released, the circuit then being maintained through contact 1CR-1, the normally closed contact 4TR-A of thermal timer 4TR, and normally closed switch SW-2 to supply power to the control relay 1CR to keep its contacts closed. Switch SW-2 is controlled by the button on the control panel and serves to completely deenergize or shut down the apparatus. At the same time, transformers T-2 and T-3 are energized along with the power supply PS-1 which supplies high voltage power to the corona charging device 284, the corona transfer device 308 and the corona precleaning device 324. Fluorescent lamp LMP-4 is also energized through a conventional starter S-1 and ballast L-1 circuit.

Switch SW-8, which is a mechanically interlocked three-position, push-button switch is used to control the voltage applied to the resistance elements of the heat fuser 310. Switch SW-8 is shown on the control panel of the apparatus in a suitable location to be accessible by the operator. As shown, the different contacts of switch SW-8 are connected to different secondary taps of the multiple tap transformers T-2 and T-3 to supply preselected voltages to the resistance elements R-1, R-2 and R-3 of the heat fuser 310.

As transformers T-2 and T-3 are energized, power is supplied directly to the resistance element R-1 which is the heating element of the fuser normally used, and through the normally closed contact 3TR-A to the resistance elements R-2 and R-3. Resistance elements R-2 and R-3 are used as an auxiliary heating element to aid in bringing the heat fuser up to its normal operating temperature rapidly. Thermal timer 3TR, which is also energized upon the closure of switch SW-1 and contact 1CR-2, is a 300-second timer, that is, 300 seconds after it is energized while at ambient room temperature it will heat up sufficiently to open its contact 3TR-A thereby de-energizing resistance element R-2.

If the machine is operated for a sufficient period of time to permit the heat fuser to be brought up to its normal operating temperature and then the machine is shut down, there will be considerable time delay before the heat fuser will cool sufficiently to reach ambient room temperature. Now, if the machine is again energized and the resistance elements R-2 are again energized for a three-minute interval, there would be sufficient heat capacity left in the fuser so that with the additional heat supplied by resistance elements R-2 the fuser would become overheated to the extent that a support material, such as paper, passing therebeneath would be scorched. To prevent this, a thermal timer 3TR is chosen with a characteristic curve such that it too will have an extended period of time in which to cool down sufficiently to close its contacts 3TR-A. With a timer of this type, it is then possible to reenergize the machine after a brief shut down interval without overheating the fuser because a 300-second cycle will no longer be necessary to heat up the timer 3TR to open its contacts 3TR-A.

The third resistance element R-3 can be connected by an operator, if required, in order to fuse powder images on card stock, master stock, or heavy transfer material, for which a higher heat output is necessary. For this purpose, there is provided a switch SW-9, positioned on the apparatus control panel for access by the operator.

Simultaneously with the closure of switch SW-1 the following motors are energized: The main drive motor MOT-7 for driving the xerographic drum, the document conveyor, the support material conveyor and the mirror assembly; a brush cleaner MOT-6 suitably connected for rotating the cleaning brush 326; the motor MOT-8 for operating the developer conveyor 292 and the toner dispenser 296; and the motor MOT-3 for blower 336; and motors MOT-4 and MOT-5 for circulating air within the machine and for removing exhaust heat from the fuser unit and also motors MOT-9 and MOT-10 which operate blowers to remove heat from the document lamps LMP-1 and LMP-2.

The main drive motor MOT-7 and the developer drive motor MOT-8 may be controlled by switch SW-7 for the purpose of cleaning the xerographic drum. With the switch SW-7 in the normal operating or "OFF" position, the motors MOT-7 and MOT-8 are under the control of main power switch SW-1A, and contacts 1CR-2 whereby power is supplied immediately to the main drive motor MOT-7 upon closure of the switch SW-1A and to motor MOT-8 by the closure of normally open contacts 7CR-2. When the machine is shut down, the switch SW-7 may be turned to the "ON" position whereby the motors MOT-7 and MOT-8 are operated directly from line current rather than through switch SW-1A. This procedure permits the drum to be rotated for solvent cleaning and the developer to be operated to change the developer charge. The actuation of switch SW-1A and the closure of contact 1CR-4 also produces immediate illumination of fluorescent lamps LMP-1 and LMP-2, located over the platen in the document conveyor, through the conventional induction circuit L-2.

As contacts 1CR-2 are closed, a 20-second timer 2TR is energized as is the 4½ minute shutdown timer 4TR. Timer 4TR is energized through normally closed contacts 2CR-2 and 7CR-1 and, if left energized for 4½ minutes, would open its contacts 4TR-A to deenergize the machine circuit. The thermal timer 2TR provides a 20-second time delay after the initial operation of the machine; that is, after actuation of switch SW-1A, the normally open contacts 2TR-A in the paper gripper bar circuit are not colsed for 20 seconds so that the gripper bar will not accept a sheet of support material until the fuser has been heated sufficiently to fuse the powder image on the support material.

Assuming that the gripper bar is in the home position so that switch 7LS is actuated by switch actuator 305 on the conveyor chain 302, then the contacts 7LS-A have been closed and when the timer 2TR actuates contacts 2TR-A, after a 20-second delay, the print load lamp LMP-6, also shown on the control panel, is lit through the circuit consisting of contacts 1CR-2, 7LS-A and the normally closed contacts 8LS-B. The machine is thus indicated to be ready to make a xerographic reproduction.

The operator may now insert a sheet of support material into the paper gripper 304. The leading edge of the support material will trip the actuator of the limit switch 8LS to thereby open contacts 8LS-B cutting off the circuit to the lamp LMP-6 and closing the contact 8LS-A energizing a two-second thermal timer 1TR which, after the two-second time delay, actuates its contact 1TR energizing relay 5CR. The 1TR thermal time delay timer provides a two-second time delay to allow the operator to adjust the sheet of support material within the gripper bar before the gripper bar closes, drawing the support material into the xerographic apparatus. As control relay 5CR is energized, its normally open contacts 5CR-1A and 5CR-2 are closed and its normally closed contact 5CR-1B is opened. The closing of contact 5CR-1A actuates relay 3CR, the function of which is described below, and the closing of contacts 5CR-2 provides a holding circuit for the relay 5CR after the initial movement of the gripper bar has released the limit switch 8LS.

Actuation of the relay 3CR closes its normally open contact 3CR-A and opens its normally closed contact 3CR-B. The contacts 3CR-A and 3CR-B are in a D.C. circuit which is actuated through a four-way bridge rectifier SR-1 and controls the operation of electrical clutches SC-1 on the drive mechanism of the gripper bar, SC-2 on the lens drive mechanism, and the two magnetic clutches SC-3 and SC-4 which control the mirror drive transmission to drive the mirror assembly upward and downward, respectively. Immediately upon actuation of relay 3CR and closing of contacts 3CR-A, the clutch SC-1 is actuated providing drive from the motor MOT-7 to the conveyor chains 302 and the gripper mechanism, carrying the sheet of support material into the xerographic apparatus. The gripper mechanism moves forward until the switch actuator 305 contacts limiting switches 9LS or 10LS. The 9LS switch is used when master stock is the support material fed into the gripper mechanism and 10LS is used when ordinary paper is the support material fed into the gripper system. Upon actuation of either the limiting switch 9LS or 10LS, the normally open contacts 9LS-A or 10LS-A are closed and the normally closed contacts 9LS-B or 10LS-B are opened.

Manually operated switches SW-4A and SW-4B, located on the control panel, control the selection of circuits through either the contacts 9LS-A and 9LS-B or 10LS-A and 10LS-B, depending upon whether master stock or ordinary paper is used as the support material medium. Closing of the switch SW-4A energizes the circuit through the 9LS contacts and closure of the switch SW-4B energizes the circuit through the 10LS contacts. Switches SW-4A and SW-4B are mechanically interlocked switches so that only one of them energizes a circuit at a given time. The reason for the two circuits and the two limiting switches is that master stock has a larger border around the top of the support material than does ordinary paper, therefore, the gripper mechanism starts from a point approximately ¾ of an inch closer to the drum surface. The leading edge of the powder image on the drum surface is placed upon the master stock at a point further from the leading edge of the master than would be true of ordinary paper stock.

When the contacts 9LS-B and 10LS-B are opened, the holding circuit to the relay 5CR and the two-second gripper delay 1TR are deenergized and, consequently, contact 5CR-1A is opened, deenergizing the relay 3CR which permits the contact 3CR-A to open cutting off the circuit to the gripper clutch SC-1, thus stopping the gripper bar at this position. Also, upon actuation of 9LS or 10LS, the normally open contacts 9LS-A or 10LS-A are closed, energizing lamp LMP-7 through normally closed contacts 12CR-1 and 4CR-1. The lamp LMP-7 is located on the control panel and indicates that a document may be loaded into the conveyor system at this time.

At this point in the operation, the gripper bar is at rest and contains a sheet of suport material. The conveyor mechanism is oriented to receive a document. A document may be then fed into the conveyor system which is being operated by the main drive MOT-7 through the document drive transmission 458, which is under the control of electrical circuitry described below. The document lamps LMP-1 and LMP-2 have been previously energized when the switch SW-1A was originally actuated as previously described. The document is taken by the conveyor belts and moved forward toward the platen 34.

On each side of the conveyor there is a limit switch 5LS and 6LS which prevent misfeeds of the document, that is, they insure that the document is properly aligned as it is fed onto the conveyor. As seen in the schematic wiring diagram, there is a document misfeed circuit which is energized through switch SW-1B which is mechanically interlocked with switch SW-1A so that actuation of switch SW-1A opens the document misfeed circuit by breaking the contacts produced by switch SW-1B and, thus, releasing a relay 2CR deenergizing the document misfeed circuit. Also in the document misfeed circuit is a mechanically operated switch SW-3 which is located on the control panel and permits an operator to stop the document feed at any given point by actuating switch SW-3. Closing of switch SW-3 actuates relay 2CR which closes contact 2CR-1 and provides a holding circuit through relay 2CR which, as previously described, remains actuated until the switches SW-1A and SW-1B are actuated. When a document is misfed into the conveyor, either of one of the limiting switches 5LS or 6LS is tripped by the document, closing one of the normally open contacts 5LS-A or 6LS-A energizing the relay 2CR. Energizing relay 2CR closes normally open contact 2CR-1 which provides a holding circuit for relay 2CR and opens normally closed contacts 2CR-2 which is used to energize the circuitry to the document drive transmission 458. When the contact 2CR-2 is opened, the conveyor comes to a stop and the document may be removed and reinserted in the machine after switch SW-1A and switch SW-1B have been manually actuated to place the machine in an operating condition.

If the machine is stopped during operation and the gripper bars are not in the home position, then the switch 7LS is not actuated and the relay 3CR cannot be energized to actuate the gripper clutch SC-1. To prevent this condition, a circuit including relay 15CR has been incorporated to bypass the open contacts 3CR-A by passing through the normally closed contacts 3CR-B and 15CR-2B to the clutch SC-1. Thus, upon restarting the machine, the gripper bars will immediately return to the position where 7LS is actuated. During normal operation, the relay 15CR is actuated through contacts 7LS-A and closes its own holding circuit through contacts 15CR-1A and removes itself from the influence of switch 7LS by opening contacts 15CR-1B. In this condition, relay 15CR holds the contacts 15CR-2B open so that the clutch SC-1 is controlled by the relay 3CR.

As the document is moved forward on the conveyor, it contacts limiting switch 12LS, the actuating arm of which protrudes up through the platen 34. Actuation of the limiting switch 12LS closes the normally open contacts 12LS-A, as seen in the schematic wiring diagram. Closing contact 12LS-A energizes control relay 7CR which serves three specific functions. It opens normally closed contact 7CR-1 which deenergizes the circuitry to the lens positioning motor MOT-1, described below, and resets the machine shutdown timer 4TR, which, as previously described, shuts the machine down unless a document is fed into the machine within a 4½-minute period. It closes normally open contact 7CR-2 which supplies power to the developer drive motor MOT-8 so that operation of the developer conveyor 292 is initiated, and it also starts the conveyor chain 302 by closing normally open contact 7CR-3 which, in sequence, actuates relays 6CR and 3CR. Thus, once a document is in a scanning position and the switch 12LS has been actuated, the developer drive and gripper bar drive are in operation and the lens positioning circuitry is disconnected so that once scanning has started, the position of the lens and the mirrors cannot be changed.

Energization of the relay 6CR closes the normally open contact 6CR-2 to provide a holding circuit for the relay 6CR through the contacts 5CR-1B, which has previously been returned to its normally closed position by actuation of either 9LS or 10LS and closes normally open contact 6CR-1 to energize relay 3CR through the normally closed contact 7LS-B of the end-of-cycle limiting switch 7LS.

The 5CR relay is used to advance the gripper bar when a sheet of support material is first inserted into the gripper bar and 6CR controls the operation after the gripper bar has advanced to a position where a document may be inserted into the conveyor. The contact 5CR-1B assures that relay 6CR will not function while 5CR is energized so that the gripper bars will not move past the ready position until a document actuates 12LS in the conveyor system. The holding circuit for relay 6CR assures that a short document which releases switch 12LS before the end-of-cycle switch 7LS is actuated will keep the gripper chain running until the gripper bars reach the home position and actuate the end-of-cycle switch 7LS. This prevents the machine from shutting down with a document in the machine that has not reached the discharge station.

The relay 3CR will remain energized until the gripper bar reaches the end-of-cycle position and the limit switch 7LS is actuated opening contact 7LS-B. The relay 3CR was previously actuated when the support material was inserted into the xerographic side of the apparatus so that the contacts 3CR-A were closed, energizing the clutch SC-1 to drive the conveyor chain of the paper gripper forward to the point where it contacted limit switch 9LS or 10LS, at which point relay 5CR was deenergized which, in turn, deenergized 3CR which stopped movement of the conveyor chain. Now, by actuating relay 6CR through the chain of sequences initiated by the document hitting the switch 12LS at the platen, the relay 3CR is again actuated and contacts 3CR-A are closed again actuating clutch SC-1 providing power to the conveyor chains of the gripper mechanism. The paper or support material is carried forward past the xerographic drum until the end-of-cycle switch 7LS is actuated by a switch actuator 305 on the conveyor chain at which point contact 7LS-B is opened deenergizing relay 3CR and stopping the movement of the conveyor chain.

As the document conveyor carries the document across the platen 34, the sheet of support material is moved in timed sequence to the movement of the document through the xerographic apparatus. The document is scanned by the lamps LMP-1 and LMP-2 as it moves across the document and the light is reflected upward into the mirror assembly 14 and the lens assembly 144 to the xerographic drum, as previously described. As the document passes beyond the surface of the platen 34, it actuates limiting switch 13LS which closes its normally open contact 13LS-A providing a holding circuit for relay 7CR. Thus, as the trailing edge of the document passes over limiting switch 12LS and releases the limiting switch, the relay 7CR will not be deenergized, stopping the developer system until the trailing edge of the document has completely passed across the platen and been scanned.

As the sheet of support material in the xerographic apparatus is carried by the gripper bar 304 past the xerographic drum, the powder image of the copy being reproduced on the drum is transferred to the support material by transfer corotron 308. The gripper bar continues along its path carrying the support material beneath the fuser 310 permanently bonding the powder image to the surface of the support material. As the gripper bar 304 passes from the fuser 310 along its path, the sheet of support material is picked up by delivery rollers 318 and 320, and the gripper mechanism is actuated to release the paper or support material so that it is now discharged from the machine by means of drive roller 320. At this point, the switch actuator 305 contacts limiting switch 7LS, which cuts off the clutch SC-1, stopping the chain conveyor in a position for the next gripper mechanism 304 to receive a sheet of support material at feed-in station 306. The entire cycle may then be repeated. If the document being reproduced and the sheet of support material are longer than the support material flow path from the feed-in station to the discharge station, then the support material is continually carried through its flow path by the discharge rollers 320. The chain 302 and the gripper bars 304 remain idle until the entire sheet of support material is discharged from the machine. It should be noted that the discharge roller 320 is continually driven from the main drive motor MOT-7.

One of the specific features of the apparatus is its ability to reproduce documents that may be of any desired length and within a given fixed width dependent upon the width of the xerographic drum. The apparatus may be arranged to give any number of enlargements or reproductions of a document being reproduced; however, the specific embodiment shown herein is settable to make any one of four different size reductions of the original document to the reproduced document. The four specific reproductions incorporated into the specific embodiment are 95%, or essentially a one-for-one reproduction, 75%, 62% and 45%. The determination of the specific enlargements or reductions is a factor determined by the speed of the conveyor relative to the speed of the xerographic drum, the position of the mirror assembly and the position of the lens assembly; therefore, by varying the speeds and positions as desired, any given enlargement or reduction may be set on the apparatus. The foregoing description of the operation included the functions of the apparatus that are coextensive with all of the various settings of the lens, mirror and document drive transmission.

Prior to making a reproduction, the operator will select the particular size reduction that is desired and the following sequence of operation may be followed to effect that size reduction. The operator makes the selection of the reduction desired by setting the rotary switch SW-6 located on the control panel of the machine. The switch SW-6 is a three-bank non-interrupting type rotary switch with spring detents at the magnification or reduction positions. Since, as previously described, the contacts 2CR-2 are normally closed when the machine is first turned on and power is supplied through the contacts 1CR-2 to 2CR-2 to the switches SW-6B and SW-6C of the three-bank rotary switch SW-6. Power is supplied to the contact SW-6A through one of the contacts of relay 8CR and serves the purpose of energizing relay 10CR. Referring to FIGS. 4 and 9, there are shown eight limiting switches, 15LS through 20LS, 28LS, and 30LS, which are actuated by the cam 184 on the lens assembly. These switches control the operation and the positioning of the lens assembly, two of the switches 28LS and 30LS are override switches on the left-hand and right-hand extreme ends of the lens travel, respectively.

There are a series of limiting switches 21LS through 26LS, shown in FIG. 11, which control the position of the mirror assembly, and there are also two override switches 27LS and 29LS. The override switches are positioned to reverse the direction of travel of the lens assembly or the mirror assembly when they exceed the last position in any direction of movement. As seen in the schematic wiring diagram, the contacts of these four switches control relays 8CR and 9CR which control the direction of drive of the lens positioning motor MOT-1 and control the mirror drive-up and the mirror drive-down through contact relays 4CR and 12CR respectively. The contacts of the relays 4CR and 12CR are in the circuit to the clutches SC-3 and SC-4 which determine the direction of travel of the mirror assembly. The mirror assembly and the lens assembly are coordinated so that the lens travels to the left only when the mirror moves downward and the lens travels to the right only when the mirror moves upward.

The override switches 29LS and 30LS on the mirror and lens assembly, respectively, control a pair of normally closed contacts 29LS-A and 30LS-A located in series in a circuit to relays 8CR and 9CR. The relays 8CR and 9CR can also be actuated by normally open contacts 27LS-A and 28LS-A located in parallel and controlled by the override limit switches 27LS and 28LS located at the bottom and left-side of the mirror and lens assembly, respectively. When the relays 8CR and 9CR are energized, the 9CR contacts control motor MOT-1 so that the lens assembly is always driven to the right and the 8CR contacts control mirror drive clutches so that the mirror assembly is always driven upwards. When the relays 8CR and 9CR are not energized, the reverse is true. Therefore, when the limiting switches are actuated, the opening or closing of their respective contacts will produce movement of the assembly in the opposite direction.

The remaining limiting switches 21LS through 29LS on the mirror drive assembly are actuated by the cam 444 and are positioned to insure that the mirror is driven in the proper direction and is stopped in the proper position. Likewise, on the lens assembly the limiting switches 15LS through 20LS are positioned to stop the lens as-assembly when actuated by the cam 184. The position of the lens and the mirror must be accurately controlled and, since the cams 184 and 144 have a definite thickness, if only one limiting switch were used for each position, it would stop the mirror or the lens in a different position depending upon whether the lens was traveling from the left to the right or from the right to the left and whether the mirror was moving upward or moving downward. This difference will vary by the thickness of the actuating arm, and the thickness of the cam. Therefore, two switches are used for each stopping position except the first and the last position and one switch at each position is actuated, depending on the particular direction of travel of the lens assembly or the mirror assembly. The two end positions, i.e., the 95% and the 45% positions, as shown herein, only contain one set of switches since they are only approached from one direction, that is, the 95% position is only approached by the mirror when it is moving downward and the 45% position only when the mirror is moving upward. The same is true of the lens assembly, the 95% position is only approached from the right to the left direction, and the 45% position is only approached from left to right.

Again referring to the schematic wiring diagram, it can be seen that the three-bank rotary switch SW-6 has three contacts, SW-6A, which is connected to relay 10CR, and SW-6B and SW-6C which are connected to line current. If we assume that the previous print was made at a 95% magnification, then all three switch contacts SW-6A through SW-6C would be in the extreme left-hand detent position, i.e., the 95% position. In this position, with the machine at rest, the contact SW-6B is on a blanking position and the overriding switches 27LS, 28LS, 29LS and 30 LS are in their deenergized positions. The contact SW-6C is in a position to supply power to relays 8CR and 9CR through contacts 8CR-3 which would be in a closed position from the previous print operation. With the relay 9CR actuated, power can only be supplied to motor MOT-1 through contacts 9CR-1A and 9CR-2A to drive the lens to the right.

Now, if the operator desires to make the next reproduction at a 75% magnification, the switch SW-6 is rotated on the front of the machine to the detent position indicated at 75%. In so operating the switch SW-6, the contacts SW-6A, SW-6B and SW-6C move from the 95% position past a blank position to a third non-detent position wherein contact SW-6A is blanked, SW-6B energizes relays 8CR and 9CR if the machine is making an initial reproduction after starting or after shutdown, and switch SW-6C provides a holding circuit through contacts 8CR-3 which are closed upon the energization of relay 8CR. Then the contacts SW-6A through SW-6C are moved further to the 75% detent position wherein the circuit to relays 8CR and 9CR are held through switch SW-6C; contact SW-6B is blanked; contact SW-6A provides a closed circuit through contact 8CR-1A, which is now closed due to the actuation of relay 8CR, and normally closed contact 18LS-B, to energize relay 10CR. With the energization of relay 10CR, the contact 10CR-2 is closed energizing the motor MOT-1 to move the lens in the proper direction, as previously described, and contacts 10CR-1A are closed energizing the lens clutch SC-2 so that the lens is now moved from a left to right direction. At the same time the contacts 10CR-1B are opened, deenergizing the mirror up and mirror-down clutches SC-3 and SC-4, so that the mirror assembly will not move while the lens assembly is being positioned. When the lens assembly reaches the 75% position, the cam 184 actuates the switch 18LS. Actuation of the limiting switch 18LS serves the purpose of cutting off the circuit to the relay 10CR by opening contact 18LS-B. Relay 10CR reverts to a deenergized position wherein the contacts 10CR-1A to the lens clutch are opened and the contacts 10CR-2 to the lens positioning motor MOT-1 are opened, deenergizing the circuits thereto, also contacts 10CR-1B return to their normal closed position energizing the circuits to the mirror up and mirror down clutches SC-3 and SC-4. As that circuit presently stands, the relay 12CR is deenergized so that the normally open contacts 12CR-2A prevent energization of the mirror up clutch SC-3, likewise, the normally open contacts 4CR-2 of relay 4CR prevent energization of the mirror down clutch SC-4. Simultaneously with the opening of the contacts 18LS-B, the contacts 18LS-A are closed so that as the lens assembly reaches the proper position the relay 12CR is actuated. Relay 12CR closes its contacts 12CR-2A in the mirror up clutch SC-3 circuit. With the clutch SC-3 of the mirror drive transmission actuated, the mirror is driven upward until the cam 444 actuates limiting switch 24LS. Actuation of limiting switch 24LS opens its normally closed contacts 24LS-B, deenergizing relay 12CR and opening the contacts 12CR-2A which, in turn, deenergize the clutch SC-2 stopping the mirror drive. Also, simultaneously therewith, the contacts 24LS-A are closed actuating solenoid SOL-10 which is mounted on the document drive transmission to provide the proper gear train to drive the document conveyor at the speed necessary for a 75% reduction in size.

Identical circuitry is repeated for the transition to any particular percent reduction necessary when traveling from a left to right direction for the lens assembly and from a bottom to a top position of the mirror drive assembly. The difference in operation being that with the lens system traveling to the right, limiting switch 19LS is actuated at the 62% position and limiting switch 20LS is actuated at the 45% position. Likewise, as the mirror continues to travel upward, the limiting switch 22LS is actuated at the 62% position and limiting switch 21LS is actuated at the 45% position.

If the lens assembly is moving from the right to the left and the mirror is moving from a top to a bottom position, the relays 8CR and 9CR are deenergized by the blanking position of the switch just before each detent position so that the lens positioning motor MOT-1 is energized through contacts 9CR-1B and 9CR-2B and travels in the opposite direction, and the contacts 8CR-1A and 8CR-2A remain open and the contacts 8CR-1B and 8CR-2B remain closed, thus the circuitry for the lens drive system is controlled by limiting switches 17LS at the 62% position and 16LS at the 75% position. Also, the control of the mirror drive assembly going from the top down is controlled by limiting switches 23LS at the 62% position and 25LS at the 75% position. It should also be noted that there are two relays 11CR and 13CR in the document drive circuitry for the 45% and 62% speeds of the document conveyor which control the operations of lamps LMP-3 and LMP-5 located at the side of the platen 34 to provide additional illumination on the document edges when full width documents are being reproduced.

While the invention has been described with reference to the structures disclosed herein, it is not confined to the details set forth, and this application is intended to cover such modifications or changes as may come within the purposes of the improvements or the scope of the following claims.

What is claimed is:

1. A document reproducing apparatus of the type wherein a light image of the document being reproduced is reflected through a light path onto a photosensitive surface including:
   a frame;
   a document conveyor mounted on the frame to carry a document between a document feed station and a document discharge station;
   light sources supported on the frame between the feed station and the discharge station to illuminate an area of a document on the conveyor and to produce a light image thereof;

a xerographic processor supported by the frame adjacent to the conveyor;

a column supported by the frame and extending upwards above the conveyor and the xerographic processor;

an optical assembly mounted on the column in a position above the conveyor and the xerographic processor to transmit a light image of a document on the conveyor to the xerographic processor;

said optical assembly being movable to various positions along the length of the column to thereby vary the height of the assembly above the conveyor and the xerographic processor;

drive means operatively connected to the conveyor, the xerographic processor, and the optical assembly; and control means to regulate the speed of the conveyor and the position of the optical assembly along the length of the column.

2. A document reproducing apparatus of the type wherein a light image of the document being reproduced is reflected through a light path onto a photosensitive surface including:

a frame;

a document conveyor mounted on the frame to carry a document between a document feed station and a document discharge station;

a light source supported on the frame to illuminate an area of a document on the conveyor and to produce a light image thereof;

a xerographic processor supported by the frame adjacent to the conveyor;

a column extending upwards above the conveyor and the xerographic processor;

an optical frame mounted on the column in a position above the conveyor and the xerographic processor and movable to various positions along the length of the column to thereby vary the height of the frame above the conveyor and the xerographic processor;

an object mirror mounted on the optical frame above the document conveyor;

an image mirror mounted on the optical frame above the xerographic processor;

a lens assembly movably mounted on the optical frame to be positionable between the object mirror and the image mirror;

the object mirror being positioned on the optical frame to receive a reflected light image from a document on the conveyor and to reflect the light image to the lens assembly;

the image mirror being positioned on the optical frame to receive a light image from the lens assembly and to reflect the light image to the xerographic processor;

means to move the lens assembly between the object mirror and the image mirror to produce variations in the size of the light image reflected from the object mirror to the image mirror;

drive means operatively connected to the document conveyor, the xerographic processor, and the optical frame; and control means to regulate the speed of the conveyor, the position of the optical frame along the length of the column, and the position of the lens assembly between the object mirror and the image mirror.

3. A document reproducing apparatus including:

a document scanning station;

a document conveyor positioned to carry an original document past the scanning station at a constant speed;

light sources arranged at the scanning station to illuminate a document on the document conveyor;

a xerographic processor for producing xerographic copies from light images of documents moving past the scanning station;

an optical assembly containing a first mirror positioned to receive a light image reflected from a document moving past the scanning station, a second mirror optically aligned with the first mirror and the xerographic processor to transmit light images from the first mirror to the xerographic processor, and a lens movably mounted in optical alignment with the first mirror and the second mirror to focus a light image from the first mirror onto the second mirror;

first drive means to position the lens assembly between said first mirror and said second mirror to produce size variations in the light image reflected from said first mirror to said second mirror;

second drive means to move the optical assembly relative to the scanning station and to the xerographic processor, and to drive the document conveyor and the xerographic processor at selectable relative speeds; and control means to regulate the speed of the document conveyor, the position of the lens, and the position of the optical assembly with respect to a preselected reproduced image size.

4. document reproducing apparatus including:

a document scanning station containing light sources positioned to illuminate a portion of a document and a light tunnel positioned to receive and transmit light reflected from a document;

a document conveyor positioned to transport a document through a path past the scanning station at a constant speed;

a xerographic processor including a xerographic drum mounted to receive a light image and means to transfer a developed xerographic powder image to a sheet of support material;

an optical system including a first mirror, a second mirror, and a movable lens, the first mirror being positioned above the scanning station in a position to receive reflected light from the light tunnel at an angle to reflect the light from the light tunnel to the movable lens, the second mirror positioned to receive a light image from the movable lens and to reflect the light image onto the surface of the xerographic drum;

the movable lens being positioned between the first mirror and the second mirror to receive light reflected from the first mirror for transmittal to the second mirror and being movable between said first mirror and said second mirror to selectively produce variations in the size of the reflected image;

the entire optic system being movable relative to the scanning station and the xerographic drum whereby the distance from the scanning station to the first mirror and the distance from the xerographic drum to the second mirror may be varied in accordance with a predetermined size variation of the light image from the scanning station to the xerographic drum;

drive means for driving the document conveyor and the xerographic drum at proportionate speeds in accordance with the size deviation of the light image between the scanning station and the xerographic drum, and to move the optical system to predetermined positions in accordance with the size deviation of the light image; and control means for coordinating the position of the optical system, the movable lens, and the speed of the document conveyor with respect to a preselected reproduced image size.

No references cited.

EVON C. BLUNK, *Primary Examiner.*